(12) United States Patent
Stevens et al.

(10) Patent No.: US 10,359,546 B2
(45) Date of Patent: Jul. 23, 2019

(54) DEFORMABLE MEMBRANE ASSEMBLIES

(71) Applicant: Adlens Limited, Eynsham (GB)

(72) Inventors: Robert Edward Stevens, Oxford (GB); Alex Edginton, Oxford (GB); Benjamin Thomas Tristram Holland, Oxford (GB); Daniel Paul Rhodes, Oxford (GB); Dijon Pietropinto, Oxford (GB)

(73) Assignee: Adlens Limited, Eynsham (GB)

( * ) Notice: Subject to any disclaimer, the term of this patent is extended or adjusted under 35 U.S.C. 154(b) by 0 days.

(21) Appl. No.: 15/416,657

(22) Filed: Jan. 26, 2017

(65) Prior Publication Data

US 2017/0146700 A1     May 25, 2017

Related U.S. Application Data

(63) Continuation of application No. 14/388,751, filed as application No. PCT/GB2013/050747 on Mar. 22, 2013, now abandoned.

(51) Int. Cl.
*G02C 7/08* (2006.01)
*G02B 3/14* (2006.01)

(52) U.S. Cl.
CPC .............. *G02B 3/14* (2013.01); *G02C 7/085* (2013.01)

(58) Field of Classification Search
CPC .......... G02B 3/14; G02C 7/085; G02C 7/049; G02C 2202/16; G02C 7/021; G02C 7/08; G02C 7/02
USPC ..................................................... 351/159.68
See application file for complete search history.

(56) References Cited

U.S. PATENT DOCUMENTS

| 5,138,494 A | 8/1992 | Kurtin |
| 5,371,629 A | 12/1994 | Kurtin et al. |
| 2007/0279585 A1 | 12/2007 | Bartoli |

FOREIGN PATENT DOCUMENTS

| CN | 1146243 A | 3/1997 |
| CN | 1300372 A | 6/2001 |
| GB | 2353606 A | 2/2001 |
| WO | WO-91/17463 A1 | 11/1991 |
| WO | WO-99/61940 A1 | 12/1999 |
| WO | WO-2007017089 A1 | 2/2007 |
| WO | WO-2011/046956 A1 | 4/2011 |

*Primary Examiner* — William R Alexander
*Assistant Examiner* — Henry A Duong
(74) *Attorney, Agent, or Firm* — Mintz Levin Cohn Ferris Glovsky and Popeo, P.C.

(57) ABSTRACT

A deformable membrane assembly comprising a fixed support, a fluid-filled envelope, one wall of which is formed by an elastic membrane that is held under tension around its edge by a flexible membrane supporting member, the supporting member being coupled to the fixed support at a plurality of discrete control points around the supporting member by engaging members for controlling the position of the membrane edge; and an adjuster for adjusting the pressure of the fluid within the envelope to adjust the shape of the membrane; wherein at least three control points are provided that are situated around the membrane edge at spaced locations selected to increase the energy of the lowest order out-of-plane bending mode of the supporting member while allowing the membrane to deform according to one or more selected Zernike polynomials. An article of eyewear comprising such a deformable membrane assembly is also disclosed.

23 Claims, 10 Drawing Sheets

DEFORMABLE MEMBRANE ASSEMBLIES

CROSS-REFERENCE TO RELATED APPLICATIONS

This application is a continuation of and claims priority under 35 U.S.C. § 120 to U.S. Application No. 14/388,751 filed Sep. 26, 2014, which is a national stage application, filed under 35 U.S.C. § 371, of International Application No. PCT/GB2013/050747 filed on Mar. 22, 2013, which claims priority to, and benefit of Great Britain Application No. 1205394.8 filed on Mar. 27, 2012; Great Britain Application No. 1221140.5 filed on Nov. 23, 2012; and, Great Britain Application No. 1302794.1 filed on Feb. 18, 2013, each of which is herein incorporated by reference in its entirety.

BACKGROUND

The present invention relates to deformable membrane assemblies in which fluid pressure is used to control the shape of an elastic membrane by applying a fluid directly to one face of the membrane, and has particular reference to fluid-filled lenses and mirrors in which the elastic membrane forms a lens or mirror surface, and the pressure of the fluid is controlled to adjust the degree of curvature of the membrane and thus the power of the lens or mirror. The invention is equally applicable to other apparatus or equipment, such as acoustic transducers and the like, in which an elastic surface of statically or dynamically variable shape is required.

Fluid filled lenses of the kind in which the pressure of fluid is used to control the shape of an elastic membrane in contact with the fluid are known in the art. Generally these lenses may be of the "fluid injection" type, in which the amount of fluid is controlled within an envelope having a substantially fixed volume that is bounded on one side by the membrane, or the "fluid compression" type in which the volume of an envelope is adjusted that is bounded on one side by the membrane and contains a fixed amount of fluid. In each case, the pressure of the fluid within the envelope is adjusted, either by adding or removing fluid to or from the envelope, or by changing the volume of the envelope, to control the fluid pressure acting on the membrane, thereby to control the shape of the membrane.

Whilst various applications of adjustable lenses are possible, for example in cameras and other optical equipment, one use is in eyewear. An adjustable lens is particularly useful for correction of presbyopia—a condition in which the eye exhibits a progressively diminished ability to focus on close objects with age. An adjustable lens is advantageous because the wearer can obtain correct vision through a range of distances from long-distance to near vision. This is more ergonomic than bifocal lenses in which near-vision correction is provided in a bottom region of the lens, thereby only allowing the user to see close objects in focus when looking downwardly.

SUMMARY

A disadvantage of many prior art fluid-filled lenses is that they need to be circular, or at least substantially circular, with a rigid boundary, in order to maintain the sphericity of the membrane; otherwise unwanted optical distortion occurs. However, circular is not necessarily a preferred shape for certain applications, including eyewear, because it is not always considered to be aesthetically appealing for those applications. Round lenses may also be unsuitable or unpractical for certain applications, such as in optical instruments. Nevertheless, the membrane is normally required to distend spherically or in accordance with one or more desired modes—typically one or more orders of the Zernike polynomials.

In a membrane assembly of the type described above, it is frequently desired that the elastic membrane should be held under tension (pre-tension) to prevent unwanted sagging or wrinkling of the membrane owing to temperature or gravitational effects, or as a result of inertial effects within the fluid when the lens is moved. In some instances, the pre-tension that is required within the membrane to prevent sagging may be of the same order of magnitude as the additional tension that is applied to the membrane upon actuation. However, in other assemblies, depending on the thickness and modulus of the membrane materials it may be several orders of magnitude greater.

WO 98/11458 A1 for instance discloses a selectively variable focus lens having first and second transparent, flexible membranes, each of which is tensioned across and held by a peripheral annular frame formed from first, second and third inter-engaging rings. The lens of WO 98/11458 A1 is circular, so the peripheral annular frame can be made stiff to support the membranes under tension without bending.

However, in other membrane assemblies of this kind, the membrane is supported by a flexible ring or other membrane-supporting member that is designed to bend round its extent when the pressure of the fluid is adjusted in order to control the shape of the membrane. For instance, U.S. Pat. No. 5,371,629 A discloses a variable focal length lens having a non-circular membrane that is mounted on a membrane support having an annular rim that is designed to flex in a controlled manner so that, despite the use of a non-circular membrane, the membrane maintains a substantially spherical shape as it distends, thereby permitting magnification changes without introducing undesirable amounts of distortion.

Co-pending international patent application no. PCT/GB2012/051426, the contents of which are also incorporated herein by reference, also discloses a deformable membrane assembly comprising an elastic membrane that is held around its edge by a resiliently bendable supporting ring.

One of the problems inherent in the design of the lens of U.S. Pat. No. 5,371,629 A however is that the tension in the membrane acts directly on the flexible rim of the membrane support. Although the increased load applied to the rim upon varying the fluid pressure within the lens may not be sufficiently great on its own to be a significant problem, any pre-tension applied to the membrane of sufficient magnitude to prevent sagging or wrinkling to an acceptable degree would be; the flexible nature of the annular rim means that such a level of pre-tension would tend to deform or significantly destabilise the rim in an undesired and uncontrolled manner, which would impair the optical quality of the lens.

Such unwanted deformation or instability generally manifests itself in two different ways. A first of these is inward collapsing or in-plane deformation. Co-pending international application no. PCT/EP2012/075549, the contents of which are incorporated herein by reference, discloses a deformable membrane assembly comprising an elastic membrane that is held around its edge by a bendable supporting ring. The assembly described therein includes a bending controller for preventing the supporting ring from collapsing inwardly under tension of the membrane, especially pre-tension applied to the membrane to prevent sagging and wrinkling etc.

A second form of the unwanted deformation discussed above is out-of-plane deformation or distortion. In particular although the membrane is intended to flex spherically, it is also susceptible to flexing under other undesired modes owing to the surface tension in the membrane. Specifically the membrane is susceptible to flexing according to energetically favoured conformations to form a toric ("saddle") or other form. Such undesired modes are governed by the boundary shape of the membrane and may therefore not be pure Zernike modes. The risk of undesired toric deformation of the membrane is greater when the membrane is flat, but still exists to an extent even when the membrane is flexed spherically. It will be appreciated that in contrast to the undesired modes, the desired modes of membrane deformation will usually be substantially pure Zernike modes based on a unit sphere which can be regarded as sitting just outside the boundary of the membrane.

An object of the present invention is to provide an adjustable fluid-filled lens of the kind described above, in which deformation of the membrane and membrane supporting member is stabilised against unwanted modes of deformation and other out-of-plane distortions.

In one aspect of the present invention therefore there is provided a deformable membrane assembly comprising a fixed support; a fluid-filled envelope, at least one wall of which is formed by an elastic membrane that is held under tension around its edge by a flexible membrane supporting member, the membrane supporting member being coupled to the fixed support at a plurality of discrete control points round the supporting member by respective engaging members for controlling the position of the membrane edge relative to the fixed support at the control points, and the member being unconstrained between said control points; and a selectively operable pressure adjuster for adjusting the pressure of the fluid within the envelope, thereby to adjust the shape of the membrane; wherein at least three control points are provided which are situated round the membrane edge at spaced locations on the member that are selected to increase the energy of the lowest order out-of-plane bending modes of the supporting member in response to loading through tension in the membrane that do not have a node round the whole supporting member.

Looked at another way, said at least three control points may be disposed at locations round the edge of the membrane that are selected to allow the membrane to deform upon adjusting the pressure of the fluid in accordance with one or more desired modes, but to inhibit displacement of the membrane edge in accordance with one or more other undesired modes. As mentioned above the desired modes may be pure or substantially pure Zernike or other modes, whereas the undesired modes are determined by the actual outline shape of the membrane.

According to the present invention therefore the control points may be situated so as to induce one or more desired membrane bending lower order modes, while suppressing one or more undesired higher order modes. In some embodiments where there are n control points (where n is an integer of three or more), the control points may be positioned so as to inhibit undesired modes of order n+1 and to induce desired modes of order n−1.

Advantageously the control points may be situated to suppress at least the lowest order undesired mode that would exist in the absence of any control points in response to loading through tension in the membrane. Higher order undesired modes may be permitted, but they tend to be less energetically favoured and involve smaller displacements of the membrane edge, so they present less of a problem to maintaining the fidelity of the membrane shape. The control points may be positioned so as to allow the membrane to deform in accordance with at least the lowest order desired bending mode. Control points may suitably be positioned where the lowest order desired bending mode has a node that intersects with the supporting member. The control points may be positioned to inhibit spontaneous deformation of the membrane in accordance with one or more first, second or third (and/or higher) order undesired modes. Suitably the control points may be positioned to prevent undesired deformation of the membrane in accordance with at least the first order undesired modes and optionally also at least selected second or third order undesired modes that have a node on the membrane edge.

In some embodiments as described in more detail below, the supporting member may be controllably displaced at one or more control points, and such selective displacement may in some embodiments permit controlled deformation of the membrane in accordance with one or more of the same order of bending modes from which the membrane is inhibited from spontaneously adopting by the control points. In other words the supporting member may be selectively moveable at one or more control points in accordance with one or more desired bending modes to a suppressing position in which those one or more corresponding undesired modes are suppressed, displacement of the member at the one or more control points away from the suppressing position then permitting bending of the member according to those one or more desired modes. Such one or more control points may be actuation points as described below.

For optical and certain other applications, the desired modes of deformation of the membrane may be described by one or more Zernike polynomials for which the lens areas sits within the basic unit circle. Suitably in accordance with the present invention, the Arizona Fringe coefficient form of Zernike polynomials may be employed. Thus the control points may be positioned to allow at least spherical (second order defocus, $Z_2^0$) deformation and optionally spherical and selected second, third and/or fourth order Zernike polynomials to introduce one or more deviations from spherical selected from astigmatism, coma and trefoil.

The membrane may be circular or non-circular. The control points are arranged to control the position of the edge of the membrane at the control points. The profile of the membrane edge between the control points may be defined by the intersection of the sum of the one or more desired modes and the outline shape of the membrane between those points.

Suitably the bending stiffness of the supporting member may vary round the supporting member, such that upon adjusting the pressure of the fluid, the supporting member bends appropriately to control the profile of the support member between the control points and thus control the shape of the membrane. In some embodiments, in order to achieve such variation in bending stiffness round the supporting member, the dimensions of the ring may vary round its extent. The supporting member may be made from a substantially uniform and homogeneous material and have a variable second moment of area. The supporting member may have a substantially uniform depth and a variable width to control the second moment of area round the ring and thus the bending stiffness of the ring. In some embodiments, the supporting member may suitably be cut or stamped from a sheet of metal, e.g., stainless steel, of substantially uniform thickness to obtain a circular or non-circular ring of variable width in the plane of the sheet.

The bending stiffness round the supporting member may conveniently be determined by finite element analysis (FEA), for instance as disclosed in PCT/GB2012/051426. In particular, FEA may be used to calculate the required variation in bending stiffness round the supporting member that is required to control the bending of the supporting member when subjected to an increasing load as the membrane that is connected to the supporting member is strained owing to the increased (or decreased) fluid pressure in order to cause or allow the membrane to achieve a desired form when distended.

In some embodiments, the supporting member may have a constant or substantially constant stiffness round its extent.

Suitably the supporting member may be resiliently bendable.

Subject to the requirements stipulated above, each control point may be angularly spaced from its adjacent control points by an angle of 30-120° about the centre of the membrane. The angular spacing may be 40-110 or 50-100° or 60-90° or 90-120° or 100-120°. In this context by the "centre" is meant a point situated generally centrally of the membrane, which may be the geometric centre ("box centre") or, in the case of optical applications, the optical centre. It will be appreciated that it would be ineffective to place a control point at a node of the one or more undesired modes. However the control points should be situated positions on the membrane edge that are compatible with the one or more desired modes. In other words the position of the membrane edge relative to the fixed support at each control point, as controlled by the respective engaging member, should correspond to the one or more desired modes of deformation of the membrane.

Advantageously therefore in accordance with the invention control points may be positioned on the edge of the membrane at discrete locations round its extent to inhibit spontaneous undesired modes of deformation (e.g. toric modes) of the membrane as a result of the surface tension in the membrane. It will be appreciated that by judicious placement of the control points certain desired modes of one order may be permitted, while inhibiting other undesired modes, including others of the same order.

The adjuster may be selectively operable for injecting or removing fluid from the envelope for controlling the pressure of fluid in the envelope. Thus the volume of the envelope may remain substantially constant (other than distension of the membrane or other parts of the envelope causing a slight increase or decrease in the actual volume) and the fluid pressure may be controlled by selectively injecting or removing fluid from the envelope, for example by means of a selectively operable pump ("injection mode").

In some embodiments, each of said control points may comprise a hinge point at which the membrane supporting member is hinged by the respective engaging member to the fixed support. At the hinge points the supporting member may be held at a fixed location relative to the support, but a degree of in-plane movement may be permitted. It follows that at each hinge point the membrane edge should be a point of zero or substantially zero displacement relative to the fixed support for deformation in accordance with said one or more desired modes. Further, the hinge points should be disposed at locations on the membrane edge that are points of non-zero displacement relative to the fixed support for deformation in accordance with said one or more undesired modes, so as to inhibit movement of the membrane edge at those points. In some embodiments there should be at least three hinge points on the supporting member. Suitably more than three hinge points may be provided, e.g. 4, 5, 6 or more hinge points.

In embodiments in which spherical (defocus) deformation of the membrane is permitted but other modes are undesired, the hinge points may suitably be situated equidistant or substantially equidistant from the centre of the deformation, e.g. the optical centre for lenses or mirrors. In such cases, the hinge points may all lie on a circular contour of zero displacement that is concentric with the centre of deformation.

In embodiments where additional modes are desired, for instance second order astigmatism, the hinge points may still be disposed on a contour of zero or substantially zero displacement relative to the fixed support, but they will not then be equidistant from the centre.

In other words in such cases the contour of zero displacement would be non-circular. In either case, the hinge points may be positioned where the contour of zero or substantially zero displacement intersects with the membrane edge.

Alternatively said adjuster may be selectively operable for adjusting the volume of the envelope thereby to control the pressure of the fluid in the envelope, e.g. an envelope volume adjusting mechanism. For instance, the envelope may be compressible and mounted to said fixed support, and said adjuster may be operable for compressing or expanding the envelope against the fixed support, e.g., in the manner of bellows, thereby to change the volume of the envelope with a fixed amount of fluid ("expansion mode" or "compression mode").

The fixed support may be arranged to hold the envelope at a first position on the envelope, and the adjuster may be arranged to apply a compressive or expansive force to the envelope at a second position on the envelope, the first and second positions being spaced apart in the direction of compression or expansion and the envelope having a flexible side wall between the first and second positions to allow the envelope to be compressed or expanded.

The envelope may be held around its periphery by the fixed support at the first position, or the fixed support may comprise a rigid body to which the envelope is mounted. For example the envelope may further comprise another wall opposite the membrane, and said other wall may be disposed contiguously against the rigid body.

In yet another embodiment, said other opposite wall of the envelope may be rigid and may serve as the or part of the fixed support.

Suitably, the other wall may be optically transparent for at least a range of wavelengths of interest and may provide a lens surface.

The fluid-filled compressible or expandable envelope may suitably be resiliently compressible or expandable. When compressed (or expanded) the pressure within the envelope is adjusted as compared with ambient pressure, and upon removing the force that serves to compress (or expand) the envelope upon actuation of the assembly, the envelope may return resiliently to an un-actuated state to balance the pressure across the membrane. In this way, the fluid-filled envelope may behave like a fluid-filled cushion.

In some embodiments in which the assembly operates in compression (or expansion) mode, the supporting member may be held a fixed location relative to the fixed support, and the pressure adjuster may be configured for compressing or expanding the envelope relative to the fixed support. In such embodiments, each of the control points may comprise a hinge point as described above.

In some embodiments however the supporting member may be moveable relative to the fixed support for compressing or expanding the envelope. Suitably the supporting member may be spaced from the fixed support and the relative spacing between the two may be adjustable by the pressure adjuster. In some embodiments, the envelope may be mounted to the fixed support such that movement of the membrane supporting member relative to the support causes the fluid filled envelope to be compressed or expanded.

Suitably, at least one of the control points may comprise an actuation point, the adjuster being connected to the membrane supporting member at the or each actuation point by the respective engaging member for controlled displacement of the supporting member relative to the fixed support for adjusting the volume of the envelope. The engaging member should be controlled at the or each actuation point so as to displace the membrane supporting member relative to the fixed support in accordance with said one or more desired modes. This is important to maintain the fidelity of the membrane form.

As mentioned above, the position of one or more actuation points may be selected to control displacement of the support member in accordance with one or more desired bending modes, especially lower order modes. Thus the supporting member may be selectively moveable at one or more actuation points to a suppressing position in which one or more undesired bending modes are suppressed, but movement of the member at the actuation point away from the suppressing position then permitting bending according to one or more desired modes of the same order. This may be especially useful for selectively inhibiting or allowing bending of the supporting member in accordance with one more second order modes (e.g. astigmatism).

In some embodiments, all of the control points may comprise an actuation point. Alternatively at least one other of the control points may comprise a hinge point at which the membrane supporting member is hinged by the respective engaging member to the fixed support as described above. Suitably at least one actuation point and at least two hinge points may be provided. In some embodiments there may be at least one actuation point and three or more hinge points, for example 3, 4, 5, 6 or more hinge points.

Suitably, a control point—a hinge point or actuation point—may be situated at or proximate each location round the supporting member where the intersection of the outline shape of the edge of the membrane with the one or more desired modes of deformation of the membrane exhibits a turning point (anti-node) in the direction of the force or reaction applied to the supporting member by the respective engaging member, between two adjacent points where the profile of the supporting member exhibits an inflection point, or a turning point in the opposite direction. Usually, but not necessarily, the engaging members may apply a force to the supporting member at each control point in the same direction.

In some embodiments, said control points may further comprise at least one additional hinge point situated at a point on the supporting member where the supporting member remains substantially stationary as the pressure in the envelope is adjusted. There may be more than one additional hinge point. The additional hinge points are not located at turning points, but may be conveniently on the contour of zero displacement where it crosses the membrane supporting member. Typically two, three, four, five or more such additional hinge points may be provided.

The membrane supporting member holds the membrane around its edge. Suitably the supporting member may encircle the membrane. In the case of an assembly that operates in compression mode or expansion mode, the supporting member may hold the fluid-filled envelope at the second position on the envelope as mentioned above. The supporting member may comprise a plurality of discrete sections that are spaced circumferentially round the membrane, but typically the supporting member extends continuously round the membrane in the form of a closed loop. Suitably, the membrane supporting member may comprise a supporting ring that holds the edge of the membrane. By "ring" is meant a closed loop having the same shape as the edge of the membrane; the term "ring" as used herein does not necessarily imply that the supporting member is circular. The ring may have an inner side defining an opening across which the membrane is disposed, and an outer side that is unconstrained except at the control points.

In some embodiments, said membrane may be generally elongate, being longer on one axis than on an orthogonal axis, which axes pass through the centre (boxing centre or optical centre) of the membrane, and having two opposite long sides that extend across said orthogonal axis. The control points may comprise at least one actuation point on the supporting member proximate one end of the one axis, at least one hinge point proximate the other end of the one axis and at least one intermediate hinge point on one of the long sides of the supporting member intermediate the one end of the one axis and the centre. In other words the intermediate hinge point may be disposed at a point whose orthogonal projection onto the one axis is between the centre and the actuation point. One or more intermediate hinge points may be provided that are additional hinge points as defined above.

The membrane may be generally oval or rectangular. In some embodiments, the membrane may suitably have a common eyewear lens shape, e.g. a shape selected from oval, semi-oval, rectangular, wayfarer, aviator, navigator, half-eye, cat-eye, semi-cat-eye, octagon, hexagon, pentagon, semi-square, etc.

There may be one or more actuation points proximate the one end of the one axis. In some embodiments, these may be the sole actuation points round the supporting member. Advantageously, at least two intermediate hinge points may be situated on the supporting member between said one or more actuation points at the one end of the one axis and the centre of the membrane, one on one of the long sides of the supporting member and the other on the other long side. Suitably at least three hinge points may be provided in addition to the said one or more actuation points.

The membrane shape may be continuously adjustable, and at each position the supporting member may be displaced at the or each actuation point by a distance that conforms to the displacement of the actuation point in accordance with the desired bending modes.

The body of fluid may be contained within a fluid-tight or volume-conserving envelope, one wall of which is formed by the elastic membrane. The fluid may be any suitable fluid, including gases. For instance, the fluid may be water or air. To an extent, the choice of fluid will be determined by the intended application for the deformable membrane assembly. In some embodiments, a grease or gel may suitably be used. For optical uses, where the membrane assembly may be a variable focus transmitting lens assembly, transparent oil at the wavelength of interest, such as silicone oil for the visible spectrum, which can be index-matched to other components of the assembly, has been found to be particularly advantageous. Suitably said fluid may comprise a silicone oil such, for example, as 1,3,5-trimethyl-1,1,3,5,5- pentaphenyltrisiloxane having a molecular weight of 546.88 (which is commercially available from Dow Corning Corporation of Midland, Mich., USA under the trade name DC-705) or 1,3,3,5-tetramethyl-1,1,5,5-tetraphenyltrisiloxane having a molecular weight of 484.81 (available from Dow Corning under the trade name DC-704). Those skilled in the art will understand that this also comprises the functional form of a doublet (or triplet), and proper selection of materials may improve chromatic aberration correction under certain circumstances, and therefore it may be desirable to have the index and dispersion (abbe number) be suitably different.

The membrane may be made from any suitable elastic material known to those skilled in the art. For optical applications, the membrane may be reflective, or have a reflective coating on its surface opposite to the envelope, or maybe optically transparent, at least for a range of wavelengths of interest—for instance visible light. Suitably the membrane should have a substantially uniform biaxial stress/strain relationship, with an elastic modulus of up to about 100 MPa. Membranes with an elastic modulus in the range 1-10 or 20 MPa have been found to be satisfactory. For instance, in one embodiment, a membrane with an elastic modulus of about 5 MPa may be used. In some embodiments, the membrane may be made from a material having a non-uniform stress/strain relationship. Suitable membrane materials include polyethylene terephthalate (e.g. Mylar®), polyesters, silicone elastomers (e.g. poly(dimethylsiloxane), thermoplastic polyurethanes, including cross-linked polyurethanes (e.g. Tuflane®), vinylidene chloride polymers (e.g. Saran®) or glass of suitable thickness. In some embodiments, the membrane may comprise a single layer of material, but in other embodiments, the membrane may comprise a plurality of laminated layers.

The membrane may advantageously be pre-tensioned on the membrane supporting member. In the case of a laminated membrane comprising a plurality of layers, it is desirable that at least one of the layers should be held under pre-tension when the membrane is flat or minimally distended. The membrane may be held by the supporting member under tension, whereby the—tension serves to reduce or minimise sagging of the membrane when the pressure difference across the membrane is minimal. In some embodiments the membrane may be pre-tensioned to a strain of up to about 30%; pre-strains of between 0.5-20%, 1-10% or 1-5%, e.g. 2 or 3%, may be appropriate in some embodiments. Suitably the membrane may be uniformly radially stretched prior to attachment to the supporting member, but in some embodiments, the membrane may be stretched non-uniformly, especially where the membrane has a non-uniform stress/strain relationship.

Adjusting the pressure of the fluid causes the membrane to distend and become more curved. Upon actuation the membrane is stretched and the strain in the membrane increases. In some embodiments, for some applications, the actuation strain may be up to about 57%, but more typically, the incremental actuation strain may be in the range 0.05% to 10%, 15%, 20% or 25%. In some embodiments, for instance where the assembly comprises a lens, the strain in the membrane may increase upon actuation by up to about 1%. Suitably the actuation strain may be in the range about 0.1-5%, e.g. about 0.25%.

The fluid-filled envelope may comprise an inflexible rear wall that is spaced from the membrane and a flexible side wall between the membrane and the rear wall. If desired, the membrane, rear wall and fluid can be optically transparent such that the membrane and rear wall form an adjustable optical lens. The rear wall may be shaped to provide a lens having some optical power, e.g., a fixed lens. The membrane assembly may further comprise a transparent rigid front cover over the membrane, which front cover is optionally shaped to provide a lens having some optical power, e.g., a fixed lens.

In addition to the control points, one or more bending control members, or bending controllers, may control the bending or other deformation of the membrane supporting member in response to the surface tension in the membrane as disclosed in PCT/EP2012/075549.

In some embodiments, said one or more bending control members may comprise a supporting disk of substantially the same shape as the edge of the membrane and may be fixedly secured to the membrane supporting member so as to allow the transmission of forces therebetween. As described in PCT/EP2012/075549, the supporting disk may be configured to resist "in-plane" deformation of the supporting member, while permitting "out-of-plane" bending for controlling the shape of the membrane.

The membrane assembly of the present invention may be used for a variety of different applications in which it is desired to deform progressively and controllably a membrane to provide a surface having a desired form. The membrane assembly may be used for both static and dynamic applications. Thus, in some embodiments, the membrane may be required to deform statically, but for other applications such, for example, as in the field of acoustics, the membrane may be required to adjust its shape dynamically. For example, the assembly may be used to provide an acoustic surface, e.g., a diaphragm for a loudspeaker or other acoustic transducer. A particular application of the membrane assembly however lies in the field of optics, where the membrane may be used to provide a lens or mirror surface, or both.

For optical applications, especially where the assembly comprises a lens or other device that is intended to transmit light, it may be desirable in some embodiments that all parts of the assembly that lie within the field of view should be index-matched in terms of their refractive index over the spectral range of interest.

In yet another aspect of the present invention there is provided an article of eyewear comprising a deformable membrane assembly in accordance with the invention. The article of eyewear may comprise a frame with a rim portion and one or two temples, and the deformable membrane assembly can be mounted to the rim portion.

DESCRIPTION OF DRAWINGS

Following is a description by way of example only with reference to the accompanying drawings of embodiments of the present invention.

In the Drawings.

DETAILED DESCRIPTION

Figure 1:
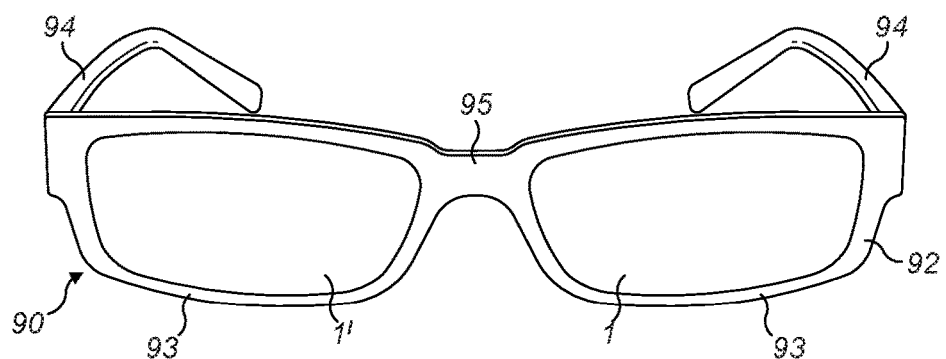
FIG. 1 is a perspective view from above of the front of a pair of eyeglasses comprising a frame that is fitted with two fluid-filled lens assemblies in accordance with a first embodiment of the present invention.

As shown in FIG. 1, a pair of eyeglasses 90 (UK: spectacles) comprises a frame 92 having two rim portions 93 and two temples 94. The rim portions 93 are joined by a bridge 95, and each rim portion 93 is shaped and dimensioned to carry a respective lens assembly 1, 1' in accordance with an embodiment of the present invention. One of the lens assemblies 1 is used for the left-hand side of the eyeglasses, and the other 1' is used for the right-hand side. As illustrated in FIG. 2b, the rim portion 93 is formed in its rear side with a recess 101 that accommodates the respective lens assembly 1, 1'. The respective lens assemblies 1, 1' are snap-fitted into their respective recesses 101, 101'.

As shown in FIG. 2b, in the regions of the upper corner of each lens assembly 1, 1' at the nose side, there is formed a protrusion 98, 98'. ("Upper" refers to uppermost when the eyeglasses are worn). The frame is formed with corresponding recesses 100, 100' (the recess 100' on the right-hand side of the bridge 95 is not visible in the figure) into which the protrusions 98, 98' fit.

Figure 2A:
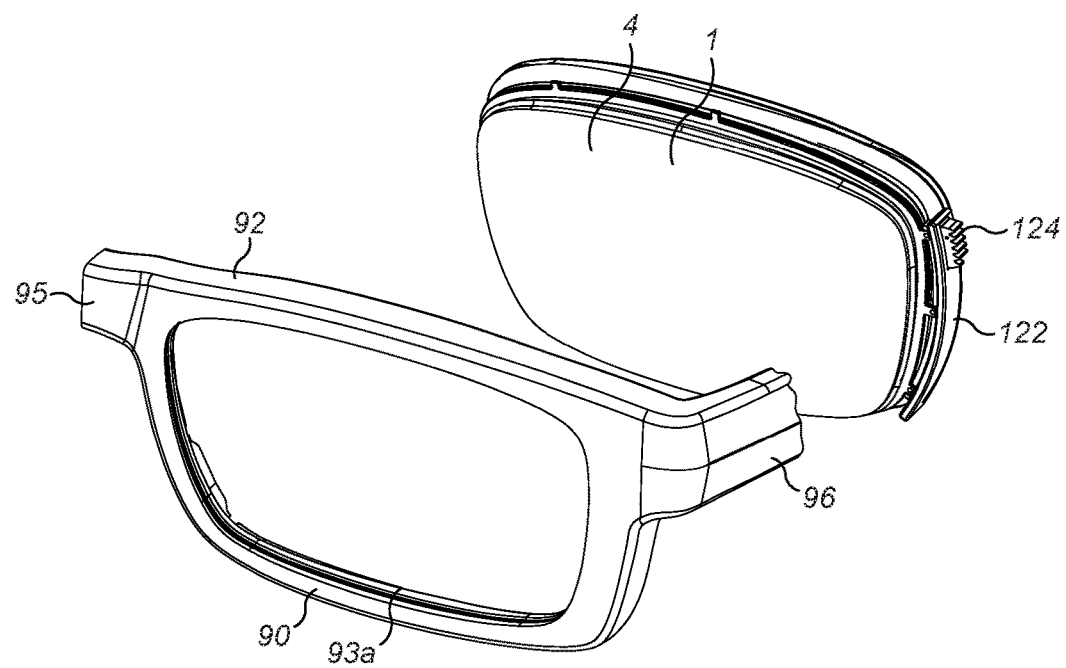
FIG. 2a is a perspective view from above and to the left of the left-hand side of the eyeglasses of FIG. 1 showing how one of the lens assemblies of the first embodiment is fitted to the frame.
Figure 2B:
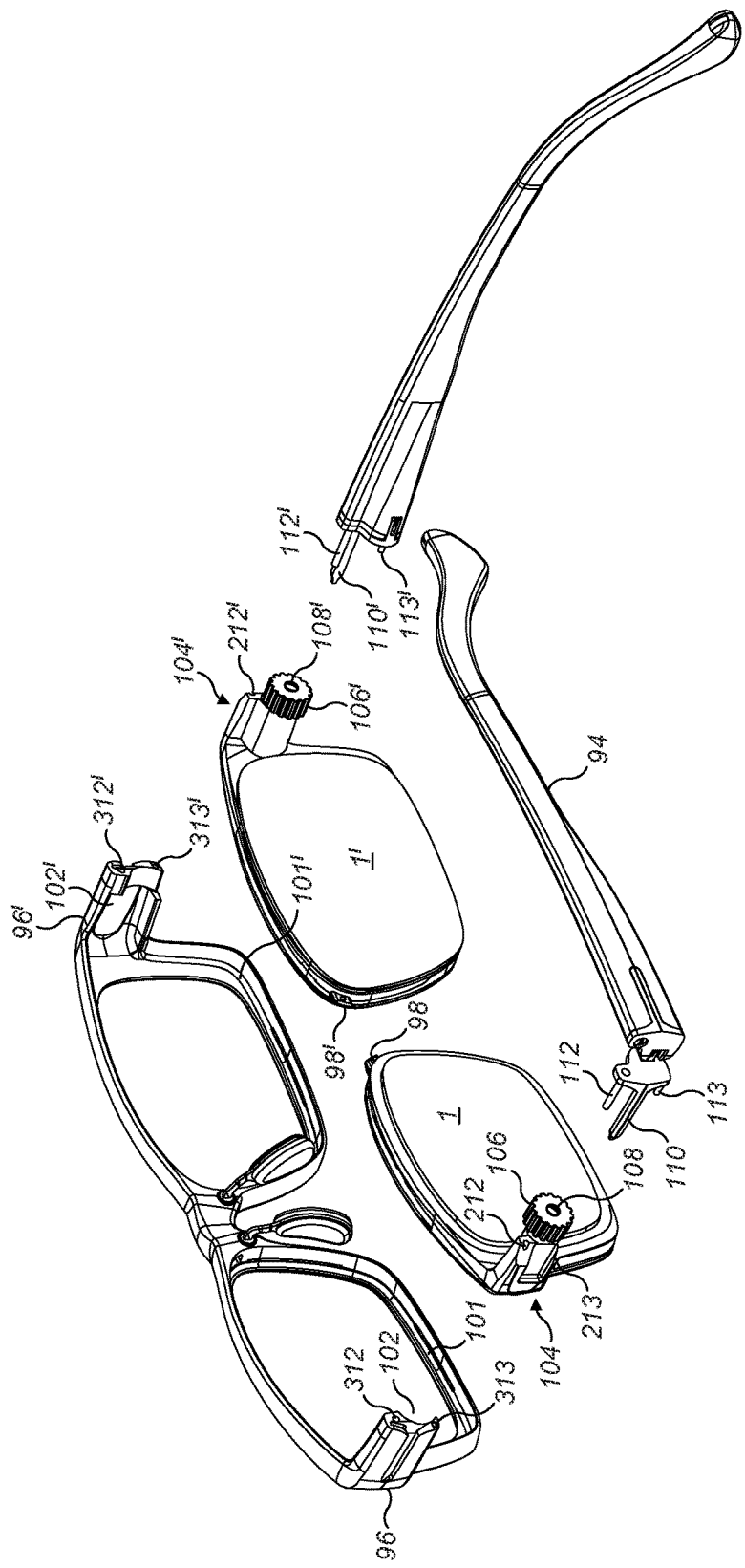
FIG. 2b is a perspective view from above and to the reverse side of the eyeglasses of FIG. 1 (i.e. from the wearer's side), also showing how the lens assembly is fitted to the frame.

It is also apparent from FIGS. 2a and 2b that the rim portions 93 each extend rearwards to form a truncated temple 96, 96'. The truncated temples have recesses 102, 102' formed in their interior faces, which accommodate adjusters 104, 104' of the lens assemblies 1, 1'. The adjusters 104, 104' each comprise a manually-operable adjuster wheel 106, 106' each of which contains a central aperture 108, 108'. A post 110, 110' protrudes from each of the temples 94 at the ends intended for joining to the frame 93 and is dimensioned to push-fit into its respective aperture 108, 108'. Also protruding from each end of the temples 94 are screws 112, 112', which protrudes from slightly inwards (towards the bridge 95) of the respective posts 110, 110' (referred to hereinafter as "inner screws"). A locator post 113, 113' protrudes from slightly below ("below" refers to below when the glasses are worn) the posts 110, 110'. The screws 112, 112' and the locator posts 113, 113' protrude parallel to the posts 110, 110' and they also fit into the adjusters 104, 104' and the truncated temples 96, 96'. Specifically each adjuster 104, 104' is formed with a respective screw thread 212, 212' positioned for alignment with the inner screws 112, 112'. Each truncated temple 96, 96' is formed with a correspondingly-aligned screw thread 312, 312'. Similarly each adjuster 104, 104' is formed with a respective recess 213, 213' positioned for alignment with the locator posts 113, 113'. Each truncated temple 96, 96' is formed with a correspondingly-aligned recess 313, 313'.

Thus, in order to fit the frame 93 to the temples 94, sandwiching the lens assembly 1, 1' therebetween, the posts 110, 110' on the temples 94 are aligned with the apertures 108, 108' in the respective adjuster wheels 106, 106'. Also, the inner screws 112, 112' are aligned with the screw threads 212, 212' in the adjusters 104, 104' and the screw threads 312, 312' in the truncated temples 96, 96'. Further the locator pots 113, 113' are aligned with the recesses 213, 213' in the adjusters 104, 104' and with the recesses 313, 313' in the truncated temples 96, 96'.

Thus the inner screws 112, 112' can be screwed into the screw threads 212, 212' in the adjusters 104, 104' and then on into the screw threads 312, 312' in the truncated temples 96, 96'. The lower screws and then on into the screw threads 312, 312' in the truncated temples 96, 96'. This results in a push-fit between the posts 110, 110' and the apertures 108, 108' and also between the locator posts 113, 113' with the recesses 212, 212' in the adjusters 104, 104' and the recesses 313 in the truncated temples 96, 96'.

It will be noted that the adjuster 104 is not shown in FIG. 2a. This is so that an outer face of a cam plate 122 and its ratchet 122 are visible. The cam plate 122 will be described in more detail below.

As can be seen from FIGS. 1 and 2b, the right-hand and left-hand lens assemblies 1, 1' are mirror images of each another, their construction being otherwise identical. Only the left-hand lens assembly 1 is described in detail below, but it will be appreciated that the construction and operation of the right-hand side assembly 1' is substantially the same.

Figure 3:
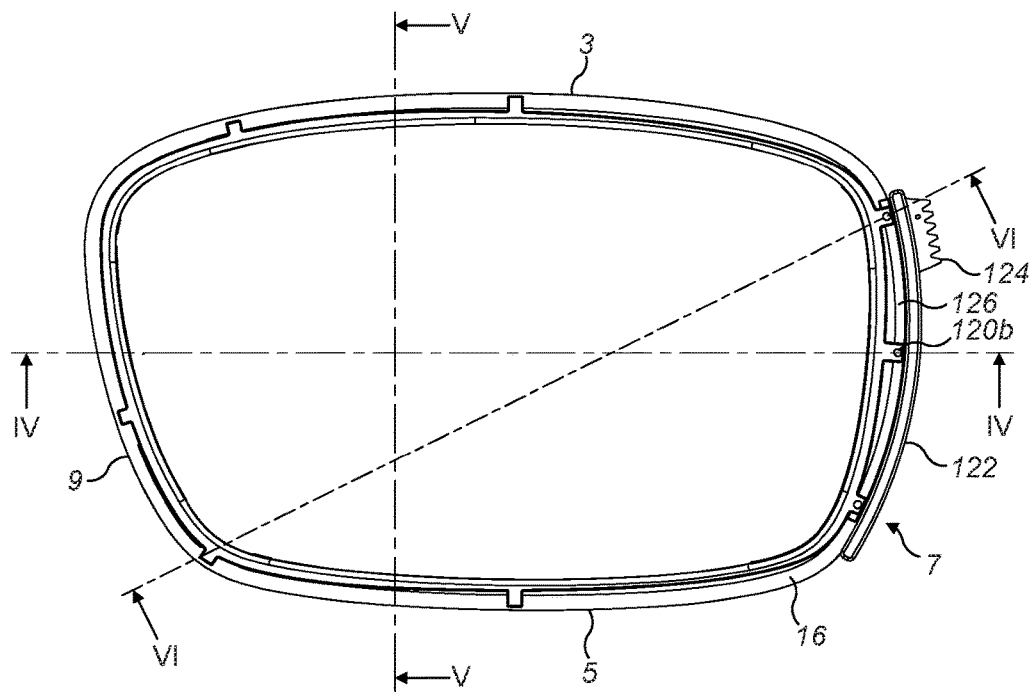
FIG. 3 is a front elevation of the one lens assembly of FIG. 2 in an un-actuated state.
Figure 9:
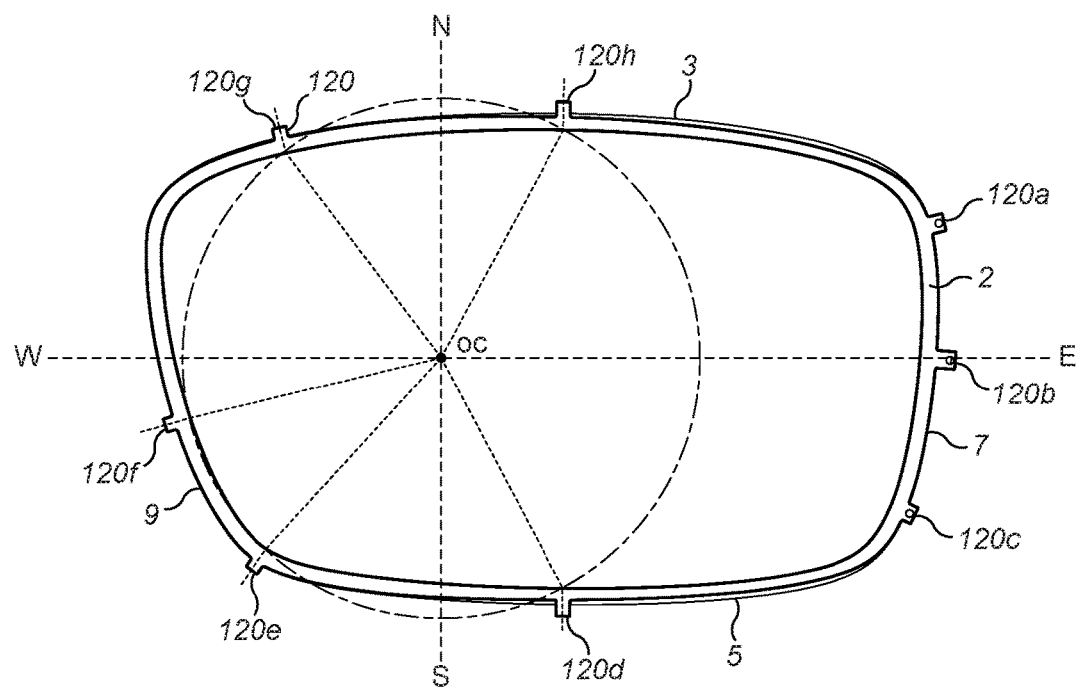
FIG. 9 is a front elevation of the flexible membrane and membrane supporting rings of the one lens assembly in an actuated state, showing how the hinge points are arranged; contour lines are included to indicate the curvature of the membrane when actuated.

As best seen in FIGS. 3 and 9, in the present embodiment, the left-hand lens assembly 1 has a generally rectangular shape with two opposing long sides 3, 5 and two short sides 7, 9 and is designed to fit in the recess 101 of the frame 92 as described above. It will be appreciated that the shape of the lens assembly shown is only one example of a suitable shape, and a deformable membrane assembly, such as a lens assembly, according to the invention may be given a wide variety of different shapes. The invention is especially suited for non-round shapes such as the one shown in FIGS. 3 and 9, but the teachings of the invention are also applicable to round lenses and other devices that include a deformable membrane to provide a surface having a predefined form.

Figure 8:
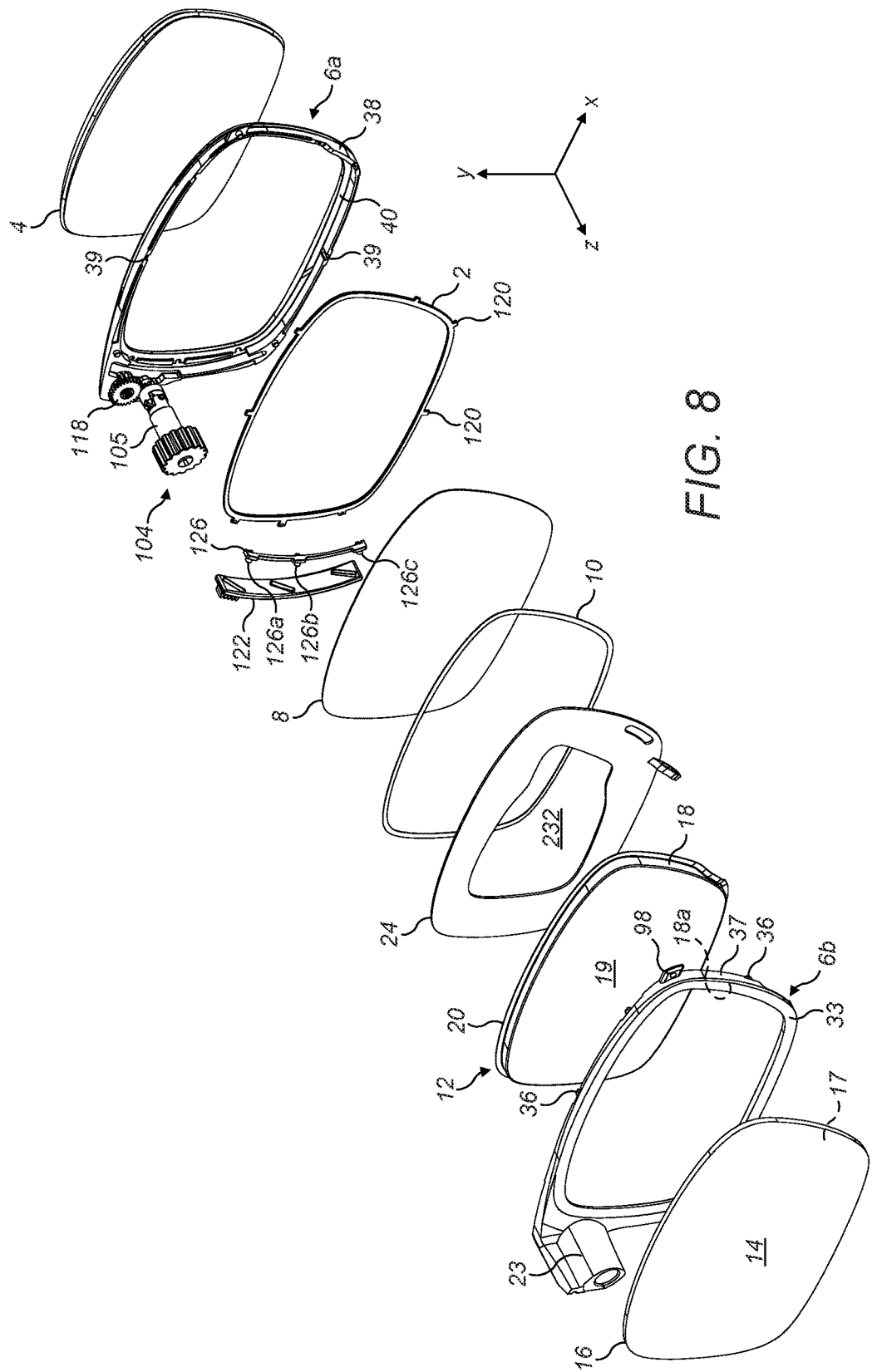
FIG. 8 is an exploded view of the one lens assembly of the first embodiment, showing the parts of the assembly.

As illustrated in FIG. 8, the lens assembly 1 comprises a transparent front cover plate 4, a transparent rear cover plate 16 and a two-part housing in the form of a retaining ring 6a, 6b, which serves to hold the parts of the lens assembly 1 together, with the front and rear cover plates 4, 16 being spaced apart on the front-rear axis—the z axis as shown in FIG. 8. The retaining ring 6 comprises a front shell 6a and a rear shell 6b.

Figure 4:
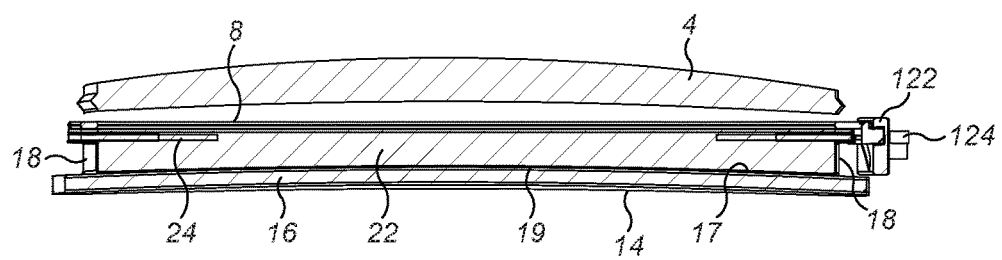
FIG. 4 is a cross-section of the one lens assembly along the line IV-IV of FIG. 3.
Figure 5:
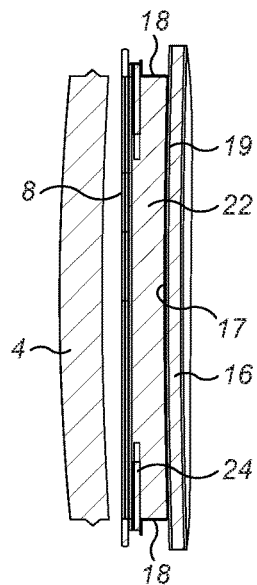
FIG. 5 is a cross-section of the one lens assembly along the line V-V of FIG. 3.

The front cover plate 4 may be of glass or a suitable transparent polymeric material. In the lens assembly 1 of the present embodiment, the front cover plate is about 1.5 mm thick, but this may be varied. In some embodiments, the front cover plate 4 may comprise a lens of fixed focal power(s), for example a single vision (single power), multifocal (two or more powers), progressive (graded power) or even an adjustable element. As shown in FIG. 4, for example, in the present embodiment, the front cover plate 4 is plano-convex.

The rear cover plate 16 has a front face 17 and a rear face 14 and may be made of glass or transparent polymer. In the present embodiment, the rear cover plate 16 is about 1.5 mm thick, but this may be varied as desired. As with the front cover plate 4, in some embodiments, the rear cover plate 16 may form a lens of a fixed focal power. In the present embodiment, for example, the rear cover plate 16 is a meniscus lens, as best seen in FIG. 4.

As shown in FIG. 8, the front shell 6a of the retaining ring 6 is formed with a rearwardly extending side wall 38 which extends rearwardly from the outer extent of the front shell 6a. The width of the front shell 6a at its front is defined by a front rim 40, against which other parts of the lens assembly 1 can fit, as described in more detail below. On the inner face of the side wall 38 are formed a plurality of recesses 39, two of which are labelled in FIG. 8. The location of these recesses around the front shell 6a will be discussed in more detail below. The front shell 6a also carries the adjuster 104. It can be understood from FIGS. 2b, 3 and 8 that the adjuster 104 is disposed on the short side 7 of the lens assembly.

As best seen in FIG. 8, the rear shell 6b of the retaining ring is formed with a frontwardly extending side wall 37, which extends frontwardly from the outer extent of the rear shell 6b. The width of the rear shell 6b at its rear is defined by a rear rim 33, against which other parts of the lens assembly 1 can fit, as described in more detail below. On an inner face 18a of the side wall 37 are formed a corresponding plurality of supporting fingers or posts 36, located in corresponding locations to the recesses 39. These supporting fingers protrude forwards from the side wall 37. The rear shell 6b is also formed with an adjuster cover portion 23, integrally moulded as part of the rear shell 6b (although this is not essential), which cover portion 23 extends rearwards—it can be appreciated from FIG. 8 that this cover portion 23 is shaped and dimensioned to fit over a shaft 105 of the adjuster 104. The shaft 105 projects rearwardly from the front of the front shell 61 and the adjuster wheel 106 is held on the shaft 105 at its rear end.

To assemble the lens assembly 1, the front shell 6a and the rear shell 6b are pushed together, with other components of the lens assembly 1 (these components do not include the front cover plate 4 and the rear cover plate 6) in between them. The rear shell 6b is dimensioned to fit contiguously against the front shell 6a, the supporting fingers 36 fitting snugly into the recesses 39. It will be appreciated that in view of the fact that the posts 36 protrude forwardly from the side wall 37, when fitted together, the front 6a and rear 6b shells can be fitted together whilst allowing room for the other components of the lens assembly 1 to be sandwiched inbetween them. The two may be glued together.

It can be seen in FIG. 8 that the protrusion 98 described above which fits into the recess 100 when fitting the lens assembly 1 into the frame 93, is formed on the rear shell 6b.

As noted above, the rear cover plate 16 is shown in FIG. 8 as being outside the rear shell 6b, and the front cover plate 4 is shown as being outside the front shell 6a. The outer face of the rearwardly-extending wall 38 of the front shell 6a, is bevelled. The front cover plate 4 is correspondingly shaped so that it can fit securely between the bevel and the recess 101 of the frame 93 when the lens assembly 1 is fitted into the frame 93. Nevertheless, the front cover plate 4 is glued to the rearwardly-extending wall 38 to form a seal. Similarly, the rear cover plate 16 is glued to the rear shell 6b. It is also glued to a fluid-filled bag 12 of the lens assembly, as will be discussed in more detail below. Once the rear cover plate 16 and the front cover plate 4 are in place either side of the retaining ring 6a, 6b and the two parts of the retaining ring 6a, 6b are fitted together in the manner described above, the lens assembly 1 constitutes a sealed unit defining an interior void.

As best seen in FIG. 2b, the retaining ring 6a, 6b is shaped and dimensioned to be received snugly within the frame 93, so that when the lens assembly 1 is held as described above with reference to FIG. 2b, it is held stably without movement. The retaining ring 6 thus forms a stable fixed support for the movable parts of the lens assembly 1, as described below.

Within the void, the lens assembly 1 accommodates a dish-shaped part 12 having a flexible side wall 18 with a forward scaling flange 20, a rear wall 19 and. In the present embodiment, the dish-shaped part 12 is made of transparent DuPont® boPET (biaxially-oriented polyethylene terephthalate) and is about 6µ thick, but other suitable materials for the dish-shaped part may be used and the thickness adjusted accordingly. The rear wall 19 of the dish-shaped part 12 is bonded contiguously to the front face 17 of the rear cover plate 16. For this purpose, a transparent pressure-sensitive adhesive (PSA) such, for example, as 3M® 8211 adhesive may be employed. In the present embodiment, a layer of PSA of about 25µ thickness is used, but this may be varied as required.

The side wall 18 of the dish-shaped part 12 is accommodated floatingly within the retaining ring 6a, 6b, adjacent the inner face 18a of the rear shell 6b. This floating arrangement allows the dish-shaped part to be compressed in the region of the one short side 7 when actuated, and allows other moveable parts of the lens assembly 1 to operate unimpeded by the retaining ring 6a, 6b, as described in more detail below.

The forward sealing flange 20 of the dish-shaped part 12 is bonded to the rear surface of a transparent diaphragm comprising a disk 24 that serves as a bending control member, as described in more detail below. The disk 24 may have a thickness of about 0.1-1.0 mm, preferably 0.3-0.7 mm, e.g. about 0.5 mm, and may be made of polycarbonate, nylon or glass in the case of a lens assembly, or a variety of plastic, metallic or ceramic components or composites in the case of an acoustic or non-transmitting membrane assembly. In the present embodiment, as best shown in FIG. 8, the disk 24 comprises a flat plate of polycarbonate having a thickness of about 0.5 mm, but suitable alternative materials that provide the required properties described below may be used instead. In the lens assembly of the present embodiment, the disk 24 is transparent, but this may not be essential in other embodiments, for example, non-optical embodiments. As best seen in FIG. 8, the transparent disk 24 comprises a large central aperture 232, such that it is of generally annular shape. The effect of the large central aperture 232 is to decouple the bending of the transparent disk 24 in the X and Y directions to maintain substantially uniform out of plane bending stiffness of the transparent disk 24 on the z-axis during actuation of the assembly 1, as described below.

The purpose of the transparent disk 24 is explained below. Various alternative designs of the disk 24 are described in more detail in co-pending international application no. PCT/EP2012/075549. As explained in that application, the precise number, size and arrangement of apertures in the transparent disk 24 may be varied as desired—for example a plurality of smaller apertures spaced across the disk 24 may be provided. In the present embodiment, the dish-shaped part 12 is sealingly adhered to the rear surface of the disk 24 using Loctite® 3555 adhesive, but suitable alternatives will be known to those skilled in the art.

The front surface of the transparent disk 24 is sealed to a membrane sub-assembly comprising a transparent, non-porous, elastic membrane 8 that is sandwiched between a pair of resiliently bendable membrane supporting rings comprising a front ring 2 and a rear ring 10. Said supporting rings 2, 10 may be made from any material that has a sufficiently high modulus to be made thin relative to the overall dimensions of the membrane assembly (e.g. about 0.05 to about 0.5 mm thickness), is joinable to the adjacent components, exhibits or is so conditioned as to exhibit low creep (to continue to perform over multiple uses) and is elastically deformable. Thus the supporting rings 2, 10 may be made from metal, e.g. stainless steel or titanium; other possibilities are glass and sapphire. By "joinable" is meant joinable by adhesive, crimping, laser welding or ultrasonic welding, or any other means that would be apparent and available to those skilled in the art. The front ring 2 may have a thickness in the range 0.2-0.75 mm, suitably 0.3 or 0.4 mm to 0.5 mm. The rear ring 10 may have a thickness in the range 0.01-0.25 mm, suitably 0.025-0.1 mm, e.g. about 0.05 mm.

Figure 6:
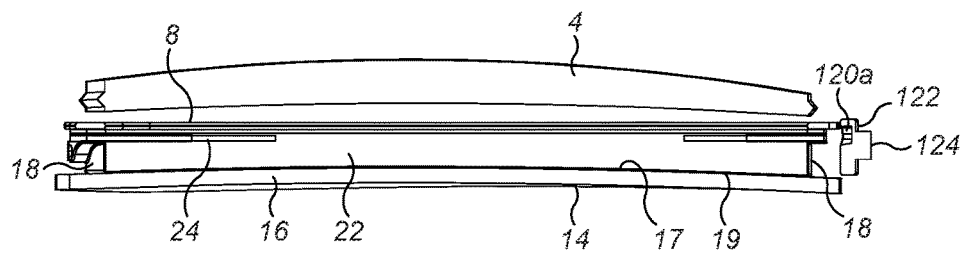
FIG. 6 is a cross-section of the one lens assembly along the line VI-VI of FIG. 3.
Figure 7:
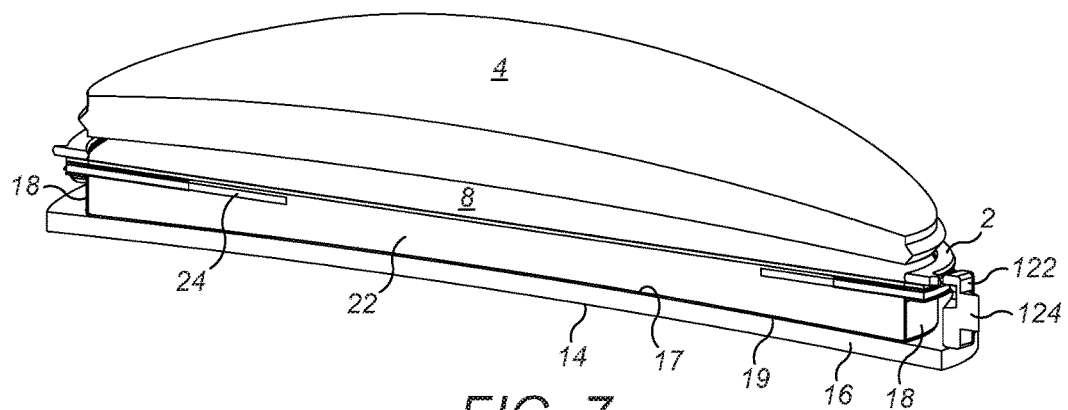
FIG. 7 is a perspective view from below and to the left of the front of the one lens assembly which is shown cutaway along the line VI-VI of FIG. 3.

As shown in FIGS. 6 and 7, the rings 2, 10 are of substantially the same overall geometry as each other and are dimensioned for being received within the interior void of the retaining ring such that the front ring 2 sits adjacent the front shell 6a of the retaining ring. However, there is a space between the front ring 2 and the front shell 6a so that the rings 2, 10 can change shape or move during use of the lens. The front and rear rings 2, 10 together form a supporting member for the elastic membrane. In the present embodiment, the rings 2, 10 are cut from a sheet of stainless steel and the rear ring 10 is about 0.3 mm thick, while the front ring 10 is about 0.05 mm thick. Other materials may be used and the thickness adjusted accordingly to provide the desired stiffness.

In the present embodiment, the membrane 8 is made of cross-linked polyurethane and is about 0.5 mm thick, but alternative materials with a suitable modulus of elasticity may be used as desired. For instance, the membrane 8 may alternatively be made of polyesters, e.g. polyethylene terephthalate (e.g. Mylar®), silicone elastomers (e.g. poly (dimothylsiloxane)), other thermoplastic polyurethanes, vinylidene chloride polymers (e.g. Saran®) or glass of suitable thickness.

The membrane 8 is pre-tensioned to a strain of up to about 20% and bonded to the rings 2, 10 such that it is stably supported around its edge as shown in FIGS. 4-7, 9 and 10. In the present embodiment, the membrane 8 is adhered to the front and rear rings 2, 10 using Loctite®3555 adhesive. The membrane 8 should form a fluid-tight seal with at least the rear ring 10.

The shape of the front ring 2 is shown in more detail in FIG. 9. The front ring 2 comprises a number of tabs 120 around its extent, which protrude outwards from the general shape of the front ring 2 i.e. away from its central enclosed area but in plane with the central enclosed area of the ring 2. Apart from the thickness, the rear ring 10 (not visible in FIG. 9) is shaped and dimensioned similarly to the front ring 2, except it does not have any tabs.

The width of the front and rear rings 2, 10 in the x-y plane varies round the periphery of the assembly 1, such that together they have a bending stiffness which varies in a predetermined manner round their extent. This is to provide for bending of the supporting rings 2, 10 when the assembly 1 is actuated to control deformation of the flexible membrane 8 and hence the power of the lens, as described in more detail below. The rear ring 10 also serves to space the membrane 8 from the disk 24.

It is desirable that the front and rear supporting rings 2, 10 should act together to balance the torsional forces applied to the rings 2, 10, optionally in combination with the transparent disk 24, when the membrane 8 is tensioned as described in co-pending international application no. PCT/GB2012/051426.

The tabs 120 on the front disk 2 are substantially square in shape but this shape is not essential.

Referring again to FIG. 9, the front ring 2 has eight tabs 120. Three of the tabs, labelled 120a-c, are spaced along the short side 7 of the lens assembly 1, where the adjuster 104 is situated. These three tabs 120a-c are used as actuation points for actuating the lens to adjust it and they are mechanically connected to the adjuster 104. Details of the adjustment mechanism are described below with respect to FIG. 13. The other five tabs 120d-h are spaced around the other short side 9 and the two long sides 3 and 5 of the lens assembly 1. As can be seen from the circle drawn as a dotted line in FIG. 9, these five protrusions all sit substantially on an imaginary circle having the optical centre OC of the lens as its centre. For ergonomic reasons, the OC is leftwards of the geometric centre in the figure, i.e. closer to the bridge 95 than to the temple 94. The OC corresponds to the point of maximum distension of the deformed shape of the elastic membrane 8 when the lens is in use. Two of the tabs, 120d and 120h, lie intermediate the OC and the one short side 7 of the assembly 1. One of these, the tab 120h, is disposed on the upper long side 3 of the supporting member; the other of these, the tab 120d, is disposed on the lower long side 5. A third tab 120g lies on the upper long side 3 towards the upper left corner in the Figure. A fourth tab 120e lies on the lower long side, towards the lower left corner in the figure. The fifth tab 120f lies on the other short side 9, a little below a line (shown dotted) passing through the OC and the central actuation tab 120b.

Referring back to FIG. 8, the tabs 120 are dimensioned to fit into the recesses 39 in the front shell 6a of the retaining ring. The tabs 120 sit on the supporting fingers 36 of the rear shell 6b. As the rear shell 6b and the front shell 6a are assembled together, the supporting fingers 36 butt up to the tabs 120 and both the tabs 120 and the supporting fingers 36 fit within the recesses 39 of the front shell 6a of the retaining ring 6. The supporting fingers 36 and the recesses 39 are dimensioned such that if the front and rear shells, 6a, 6b were fitted together without the lens assembly 1 accommodated therebetween, there would be a small gap between the ends of the supporting fingers and the front shell 6a. Thus this gap leaves space for the tabs 120. Thus the tabs 120 can be clamped between the front and rear shells 6a, 6b of the retaining ring to hold the moveable parts of the lens assembly 1 fixedly in the retaining ring 6a, 6b. Some hinging movement and in plane sliding movement can occur at the tabs 120.

The five tabs 120d-h that are not situated on the one short side 7 (and hence which do not serve as actuation points) thus serve to hinge the membrane sub-assembly to the retaining ring 6 juxtaposed the other short side 9. All of these five points can be considered to be hinge points at which the rings 2, 10 and the membrane are held relative to a fixed support provided by the retaining ring 6. Displacement of the membrane sub-assembly on the z-axis at the actuation points 120a-c to increase the fluid pressure causes the portion of the membrane sub-assembly juxtaposed the one short side 7 of the assembly 1 to move towards or away from the rear wall 19 of the dish-shaped part 12 which is held stably by the retaining ring 6, while the sub-assembly is also held immobile relative to the rear wall 19 at the remaining hinge points 120*d-h*, which serve as hinge points. Portions of the rings 2, 10 between the control points 120*a-h* otherwise "float" freely in the void between the rear cover 16 and the front cover 4.

Figure 11:
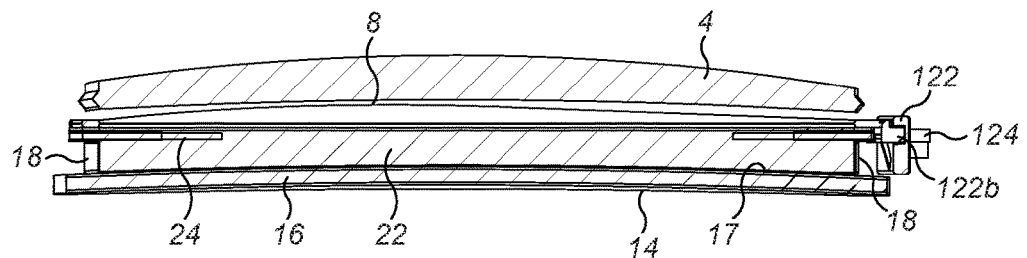
FIG. 11 is a cross-section of the one lens assembly corresponding to FIG. 4 but showing the assembly in an actuated state.
Figure 12:
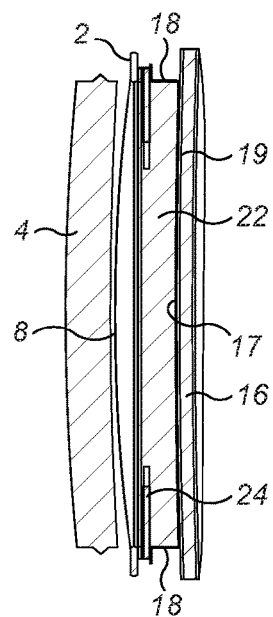
FIG. 12 is a cross-section of the one lens assembly corresponding to FIG. 5 but showing the assembly in an actuated state.

Any suitable actuation device known to those skilled in the art may be employed for selectively displacing the membrane sub-assembly at the actuation points 120*a-c* relative to the retaining ring 6 between an un-actuated position as shown in FIGS. 4-7 in which the front and rear rings 2, 10 and membrane 8 are substantially planar in the x-y plane and a fully actuated position as shown in FIGS. 11 & 12. The actuation device may be manually or automatically operable and should comprise a suitable ring-engaging mechanism for connecting the actuation device to the membrane sub-assembly for driving the membrane sub-assembly in the front-rear direction at the actuation points. The actuation device may provide for continuous displacement of the membrane sub-assembly or may be adapted to provide movement of the membrane sub-assembly only to a plurality of predetermined mutually spaced positions. The actuation device may conveniently be housed in the bridge 95 of the eyeglasses 90, or in one or both of the temples 94. A separate actuation device for each lens assembly 1, 1' may be provided in each respective temple 94, and the devices may optionally be linked to provide simultaneous actuation of the two assemblies 1, 1'. In this embodiment, separate actuators are provided in each temple 94, as previously explained with reference to FIG. 2. It will be appreciated that the force applied by the actuation device acts on the membrane sub-assembly and reacts against the retaining ring 6 through the hinge points 120, which retaining ring 6 is mounted fixedly within the frame 92 of the eyeglasses 90, so as selectively to move the membrane support and assembly relative to the retaining ring 6. The actuation device in general terms may be mechanically, electrically or magnetically operated and/or may involve use of a phase change material, e.g. a shape memory alloy (SMA), wax or an electro-active polymer.

In the present embodiment, each actuation device is a manually operable device which makes use of a cam plate 122, as mentioned above with reference to FIG. 2*a*. The adjuster 104 can best be understood with reference to FIGS. 2*a*, 3 and 13. As previously mentioned, the actuator 104 comprises an adjuster wheel 106, which in this embodiment is manually rotatable and which, once the lens assembly 1 is fitted into a pair of eyeglasses 1, is disposed on a temple 94. When so fitted, the actuator 104 protrudes rearwards from the lens assembly. As previously described, the adjuster wheel 106 is connected via a shaft 105 and sits at the rear end of the shaft 105. The opposite, front end of the shaft, remote from the adjuster wheel 106 and proximate the front of the front retaining ring 6*a* carries a first gear 116. The first gear 116 is arranged to mesh with a second, larger gear 118 disposed above the first gear 116, i.e. in a direction towards the upper long side 3 of the lens assembly 1. This second gear 118 is carried rotatably on the front retaining ring 6*a* and is arranged to mesh with the ratchet 124 disposed at the upper end of the cam plate 122. The cam plate 122 is generally elongate and arcuate in shape, and extends along at least part of the one side of the front shell 6*a* which corresponds to the short side 7 of the lens assembly, such that it can cause movement of the sub-membrane assembly at all three of the actuation points 120*a-c*. Thus the length of the shaft 105 is chosen in dependence on how far along the temple towards the wearer's ear the adjuster wheel 106 is situated.

The cam plate 122 is shaped and configured to engage with a cam follower 126. The cam follower 126 is generally elongate and extends along the short side 7 of the lens assembly. It is fixedly attached to the three tabs 120*a-c* used for actuation. The cam plate 122 comprises cam profiles in the form of three slots, 122*a-c*, which are located on the opposite surface of the cam plate to the gear 118 (i.e. on an inner surface which faces the lens assembly 1). The cam follower 126 comprises three nodules 126*a-c*, which are located and configured to protrude into the slots 122*a-c* respectively, such that when the lens is at one extremity of its adjustment, the nodules 126*a-c* sit at the upper end of their respective slots 122*a-c*. The cam plate is dimensioned roughly to have a length similar to that of the short side 7 of the lens assembly, such that it is long enough to comprise a slot to accommodate all three nodules 126*a-c* and to allow for translational movement of the cam plate 122 during operation of the lens assembly 1. As visible in FIG. 13, it is held in the front shell 6*a*. The cam plate 122 and the cam follower 126 are convex-curved so as to match generally the shape of the short side 7 of the lens assembly and each other. The slots 122*a-c* are elongate and run generally across the width of the cam plate 122 The angle on the face of the cam plate 122 along which each slot runs that which will cause a desired magnitude of displacement of the rings 2, 10 and the membrane 8 during operation of the lens assembly 1. The relative displacements of the rings 2, 10 at each of the three actuation points 120*a-c* is explained more fully with reference to FIG. 10 below.

The front 6*a* and rear 6*b* shells of the retaining ring 6 are dimensioned such that when assembled, the cover plate 4 is spaced forwardly of the front membrane supporting ring 2, as shown in FIGS. 4, 5, 11 and 12, so that the membrane 8 may distend forwardly when actuated as described below without impinging on the front cover plate 4.

The dish-shaped part 12, the membrane 8, the rear supporting ring 10 and the diaphragm 24 define a sealed interior cavity 22, which is filled with a transparent fluid. In the present embodiment, the cavity 22 is filled with transparent oil 11. In the present embodiment, Dow Corning® DC 705 silicone oil (1, 3, 5-trimethyl-1, 1, 3, 5, 5-pentaphenyltrisiloxane having a molecular weight of 546.88) is used, but a variety of other suitable colourless oils are available, especially in the family of high refractive index siloxane oils, for which there are a number of manufacturers. The oil 11 should be chosen so as not to be harmful to a wearer's eye in the event of a leakage. For non-optical applications, this is less of a concern.

The cavity 22 should not normally be over-filled, so that in the un-actuated position, the membrane 8 remains flat as described above, defining a datum plane D as shown in FIG. 10 for the membrane. The pre-tension in the membrane 8 serves to stretch the membrane to reduce the risk of undesired wrinkles or sagging owing to temperature changes, gravity or inertial effects in the oil 11 when the assembly 1 is moved. As mentioned above, the transparent diaphragm 24 has a central aperture 232, which permits the fluid to flow between the front and rear of the transparent diaphragm 24 during filling and during operation as described below.

Although the membrane 8 is planar in the un-actuated position in accordance with the present embodiment, in other embodiments the membrane may be convex (or concave) when un-actuated and may adopt a planar configuration when actuated. In such case the plane of the membrane when actuated may be used conveniently to define a datum reference plane D for measuring displacement of the rings 2, 10 or other supporting member(s) on the z-axis. In yet another alternative, the assembly may be configured such that in practice it is never planar, and yet it may still have a theoretical planar configuration that is an extrapolation of its permitted movement—either in the direction of actuation or de-actuation. Those skilled in the art will understand that even such a theoretical planar state may be used to define a datum plane for the membrane, even where in the actual un-actuated state the membrane already has a degree of curvature.

The oil 11 serves to support the dish-shaped part 12 from within, and in particular reinforces the flexible side wall 18 to prevent it from collapsing under its own weight or inertial effects within the assembly. The fluid filled cavity 22 thus forms a cushion like, resiliently compressible envelope.

In the present embodiment, the transparent oil 11 and the materials used to make the rear cover plate 16, the dish-shaped part 12, the pressure-sensitive adhesive for bonding the rear wall 19 of the dish-shaped part 12 to the front surface 17 of the rear cover plate 16, the transparent diaphragm 24 and the membrane 8 are all chosen to have an index of refraction as close as possible to one another. With the interior cavity 22 filled with transparent oil 11, the membrane 8 and the rear face 14 of the rear cover plate 16 form the opposite optical surfaces of an adjustable lens. As described above, in the present embodiment the rear cover plate 16 is a meniscus lens.

In the un-actuated state, the membrane is planar, so the lens has an optical power afforded by the rear cover plate 16, with zero addition from the membrane 8. It will be understood that for non-optical applications, the fluid, along with the other parts of the assembly do not need to be transparent and may be opaque or semi-transparent as desired.

It will be appreciated that the present invention is not limited to the particular materials and dimensions used for the present embodiment, which are given only by way of example. Different types of materials may suitably used for the dish-shaped part 12 that are optically clear, have low overall stiffness compared with the supporting rings 2, 10 and are joinable to the diaphragm 24. Different adhesives may be chosen that are able to join the parts of the assembly durably, are creep resistant, are of practical viscosity and remain inert in the presence of the fluid 11. Particular adhesives may be chosen in dependence on materials selected for the various parts.

On operating the actuation device by manual rotation of the adjuster wheel 106, the shaft 105 rotates, thereby rotating the first gear 116. By virtue of its meshing with the second gear 118, the second gear 118 also rotates and in so doing, drives the ratchet 124 to thereby apply a force which causes the cam plate 122 to move in translation upwards along the short side 7 of the lens assembly 1. Since the nodules 126*a-c* of the cam follower 126 cooperate with the slots 122*a-c*, this movement causes the cam follower 126 to translate rearwards such that the nodules 126*a-c* and run in their respective cam plate recesses 122*a-c*. Since the tabs 120*a-c* are fixedly attached to their respective nodules 126*a-c*, this causes the membrane sub-assembly at the one short side 7 of the assembly 1 to move rearwards from its un-actuated position relative to the retaining ring 6, thereby compressing the cavity 22 and increasing the fluid pressure within the cavity 22. The side wall 18 of the dish-shaped part 12 is flexible to allow this movement. The increased fluid pressure has the effect of causing the elastic membrane 8 to inflate and protrude forwards in a convex form as shown in FIGS. 11 and 12, thereby increasing the curvature of the membrane and the optical thickness of the lens between the membrane 8 and the rear face 14 of the rear cover plate 16 and adding positive optical power to the fixed meniscus lens of the rear cover plate 16.

As and when it is desired to return the lens assembly 1 to its state prior to the above-described operation, the adjuster wheel 106 may be rotated in the opposite direction, thus causing the cam plate 122 to translate in the opposite direction, thereby to return the one short side 7 of the lens assembly 1 forwards to its initial position. Consequently, the fluid pressure is decreased and the elastic membrane 8 returns to its initial shape.

It will be appreciated that in other embodiments, the actuation device could be set up to move the sub-assembly forwards from the un-actuated position, which would decrease the fluid pressure in the cavity 22, causing the membrane 8 to distend inwardly in a concave form such that, in combination with the rear face 14 of the rear cover plate 16, the composite lens would be bi-concave. In the present embodiment, the maximum curvature in the rearwards direction would be limited by the clearance between the membrane 8 and the transparent diaphragm 24. The greater the curvature of the membrane 8, the greater the additional optical power (positive or negative) afforded by the membrane 8. In such an embodiment, the flexible side wall 18 of the dish-shaped part 12 would be compressed in the un-actuated position and would expand when actuated.

For use as a lens assembly, the membrane 8 is required to deform spherically upon actuation, or according to another predefined form as described below. Other predefined forms may be desired for different optical or non-optical applications of a deformable membrane assembly in accordance with the present invention. Since the membrane 8 is non-round, the membrane supporting rings 2, 10 must bend so as to deflect on the z-axis normal to the planar datum during actuation of the assembly in order to control the shape of the membrane 8 when distended to the predefined form. In particular, the membrane supporting rings 2, 10 must bend to match the profile of the edge of the membrane 8 when the membrane 8 has the predefined form. If the membrane supporting rings 2, 10 were insufficiently flexible, or did not bend correctly, then upon actuation of the assembly 1, the edge of the membrane 8 would not match the predefined form of the membrane 8, and the overall shape of the membrane 8 would be distorted as a result. In accordance with the invention, the membrane 8 may be required to deform in accordance with one or more bending modes, and the profile of the edge of the membrane 8 therefore is defined by the intersection of the desired one or more bending modes with the outline edge shape of the membrane 8.

Figure 10:
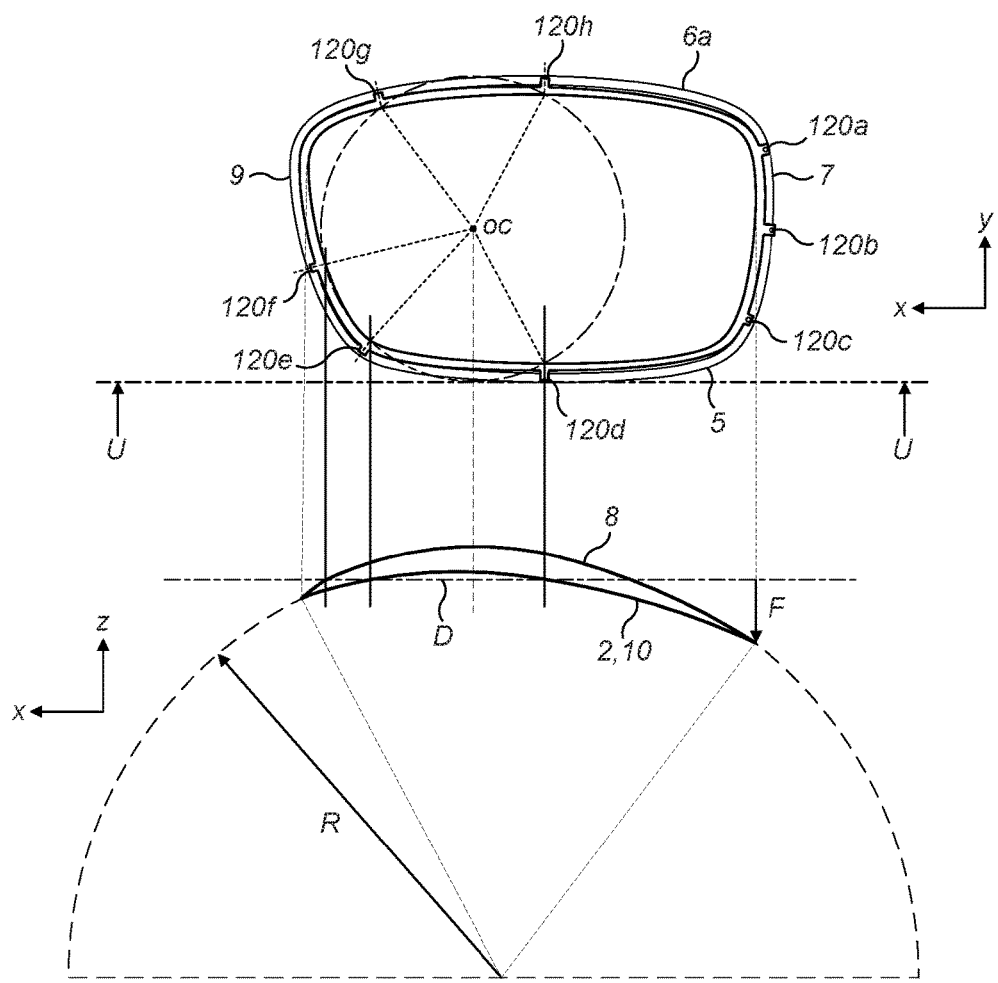
FIG. 10 shows the membrane and rings of FIG. 9 in the actuated state projected onto a notional sphere of radius R.

FIG. 10 illustrates the profile of the edge of the membrane 8 of the present embodiment that is required when the lens assembly 1 is actuated to give the membrane 8 a substantially undistorted spherical form. A contour of the spherical form and its optical centre OC at the vertex are shown in FIGS. 9 and 10 in chain-dashed lines. The upper half of FIG. 10 is a view in the x-y plane, i.e. on the front of the lens assembly 1. In the lower half of FIG. 10 the membrane 8 and the supporting rings 2, 10 are shown in solid lines projected onto a notional sphere which is shown in short dashed lines. The lower half of FIG. 10 represents the view from underneath the lens assembly 1, i.e. in direction U-U. Thus the long side 5 and part of the short sides 9 and 7 are visible. Specifically, the actuated shape of the rings 2, 10 between the tab 120*f* and the tab 120*b* are shown and labelled 2, 10. The profile of the membrane 8 between the tabs 120*f* and 120b is also visible. This line follows the contour of a sphere of radius R and passes through the OC at the point of maximum distension. By way of comparison, the membrane in its planar un-actuated state is also shown in the lower half of the figure in chain-dotted lines. The plane of the membrane in its un-actuated state represents the datum plane D for describing the actuation of the assembly 1 of the present embodiment. If the membrane 8 were circular, and spherical deformation of the membrane 8 were required on actuation, then the supporting rings 2, 10 could be rigid, since the edge of the membrane 8 would remain circular and planar in all positions between the un-actuated position and the fully actuated position. However, for spherical deformation of the membrane 8 of the lens assembly 1 of the present embodiment, the supporting rings 2, 10 must bend on actuation, as shown in FIG. 10, to avoid distortion of the membrane shape. The bending that is required is particularly pronounced along the long sides 3, 5.

In order to achieve the desired bending of the supporting rings 2, 10, the rings must be flexible to allow them to adopt to the desired profile, and their combined bending stiffness varies round their extent, so that under the influence of the increased surface tension in the membrane 8 upon actuation of the membrane assembly 1, the rings 2, 10 respond non-uniformly round their extent, causing or allowing them to bend in the predetermined manner. In the present embodiment, the variation in bending stiffness is achieved by varying the width of the rings 2, 10 round their extent as described above with reference to FIG. 9.

The actual variation in width of the supporting rings 2, 10 that is required to obtain the desired variation in bending stiffness round the rings, as described above, is calculated by finite element analysis (FEA) as described in PCT/GB2012/051426. For quasi-static or low frequency optical and other applications, static FEA may be employed adequately. However, in other embodiments, where the surface is intended for acoustic applications for instance, dynamic FEA may be appropriate. As those skilled in the art will be aware, FEA—whether static or dynamic—involves numerous iterations performed using a computer with the input of selected parameters to calculate the membrane shape that would result in practice with an increasing force F applied at the three actuation points 120a-c as shown in FIG. 10. The element shape may be selected to suit the calculation being performed. For the design of the rings 2, 10 of the present embodiment, a tetrahedral element shape has been found to be suitable. The selected parameters to be input include the geometry of the supporting rings 2, 10, the geometry of the membrane 8, the modulus of the membrane 8, the modulus of the rings 2, 10, including how the modulus of the rings varies round the rings (which may be defined empirically or by means of a suitable formula), the modulus of the disk 24, the amount of pre-tension in any of the parts, the temperature and other environmental factors. The FEA programme defines how the pressure applied to the membrane 8 increases as load is applied to the rings at the actuation point.

In order to design precisely the rings 2, 10 for optical use, the output of the FEA analysis is approximated to the desired shape of the membrane as defined by one or more Zernike modes $Z_n^{\pm m}$ based on a unit circle that lies just outside the actual boundary of the membrane. In the present embodiment, the spherical second order Zernike mode $Z_2^0$ is used, but higher spherical order functions can also be used if desired, by creating a shape that is the sum of a number of Zernike modes. In some embodiments, the membrane may be required to deform in accordance with a plurality of different desired bending mode orders, for example the sum of two or more orders of Zernike modes. For example, to create an optical lens capable of correcting certain optical aberrations in an eye, the membrane may be required to deform in accordance with a function comprising the sum of the spherical second order Zernike mode $Z_2^0$ (defocus) in combination with one or more selected other Zernike modes of the same or higher order, e.g., $Z_2^{\pm 2}$ (astigmatism) and/or $Z_3^{\pm 3}$ (trefoil).

The FEA output is correlated with the selected Zernike function across the membrane 8 to see how well the FEA output approximates to the desired shaped as defined by the selected function. Depending how well the FEA output and selected function correlate with one another, the relevant parameters of the lens can be adjusted to achieve a better fit on the next iteration. By seeing how well the simulated deformation of the membrane 8, as calculated by FEA, approximates to the desired surface shape as described by the selected Zernike polynomial function, the person skilled in the art can see how well the chosen supporting ring 2, 10 parameters perform. It is possible to determine which regions of the supporting rings 2, 10 need to be tuned (or which other parameters should be adjusted) to improve the correlation of the FEA output and the selected function that approximates to the predefined form.

The above-described iterative process is carried out over a number of different lens powers, so that a lens whose power varies continuously with deformation of the supporting rings 2, 10 (and the force F applied at the actuation points 120a-c) can be designed. The supporting rings 2, 10 are designed to bend variably by deflection on the z-axis round their extent and with respect to the adjustment in lens power required. The variation in width of the supporting rings 2, 10 in the x-y plane, perpendicular to the z-axis of the assembly 1, round their extent can also be adjusted for different lens shapes, taking into account the locations of the hinge points 120d-h and actuation points 120a-c relative to the desired optical centre OC.

Once the shape of the membrane 8 has been calculated by FEA as described above, the optical properties of the membrane 8 as an optical lens surface may be determined by suitable optical ray tracing software (e.g. Zemax™ optical software available from Radiant Zemax, LLC of Redmond, Wash.) using the calculated membrane shape.

Since the profile of the membrane supporting rings 2, 10 when actuated must conform to the profile of the edge of the membrane 8 in the predefined form, the hinge points 120d-h where the supporting rings 2, 10 are held stationary are selected to correspond to points where the rings 2, 10 are not displaced relative to the planar datum D upon actuation of the assembly 1. In order to avoid distortion of the spherical membrane shape on actuation, the hinge points 120d-h should ideally be positioned on a single circular contour relative to the optical centre OC as shown in FIG. 10, but in practice the positions of the hinge points 120d-h may depart slightly from the same contour without undue distortion of the final membrane form. In other embodiments where the membrane is required to deform in accordance with one or more non-spherical modes, the hinge points should still be situated at the points round the supporting rings 2, 10 that are not displaced when the membrane is deformed, but in such case the zero-displacement contour maybe non-circular.

In the present embodiment there are five hinge points 120d-h, but in other embodiments there may be more or fewer hinge points, provided they are all placed on or close to the same contour relative to the optical centre. Furthermore, that contour must be a contour on which the profile of the rings 2, 10 is required to remain stationary in order to achieve the required profiles of the membrane 8 during deformation of the membrane 8. Thus furthermore, since the membrane 8 is held at its edge by the supporting rings 2, 10, these points are also points where the membrane 8 remains stationary during deformation.

Similarly, the actuation points 120*a-c* where the rings 2, 10 are displaced actively on the z-axis by the actuation device to cause compression of the cavity 22 are chosen so that the actual displacement of the rings 2, 10 at the actuation points 120*a-c* at each position between the un-actuated and fully actuated positions is equal or substantially equal to the displacement of the rings 2, 10 at the actuation points that is needed for the edge of the membrane 8 to have the same profile as the edge of the membrane 8 in the predefined form. From FIG. 10 it can be seen that the displacement of the actuation points 120*b* and 120*c* is significantly below the datum plane D. On the other hand, the projection of the hinge point 120*e* onto the lower half of FIG. 10 shows that the hinge point 120*e* is located where the profile of the rings 2, 10 remains stationary on the datum plane D. In the present embodiment, three actuation points are provided, but in some embodiments there may be more or fewer actuation points, depending upon the complexity of the membrane edge profile that is needed to achieve the desired predefined form.

Design rules for the position of the control points—i.e., the actuation points and hinge points—where force is applied to the rings 2, 10—are disclosed in co-pending PCT/GB2012/051426. In general, however, there should be at least three control points to define the plane of the membrane 8, and further there should be a control point at or proximate each point on the rings 2, 10 where the profile of the rings 2, 10 that is needed to produce the predefined form upon deformation of the membrane 8 exhibits a turning point in the direction of the force F applied at the control point between two adjacent points where the profile of the ring exhibits an inflection point or a turning point in the opposite direction.

Figure 13:
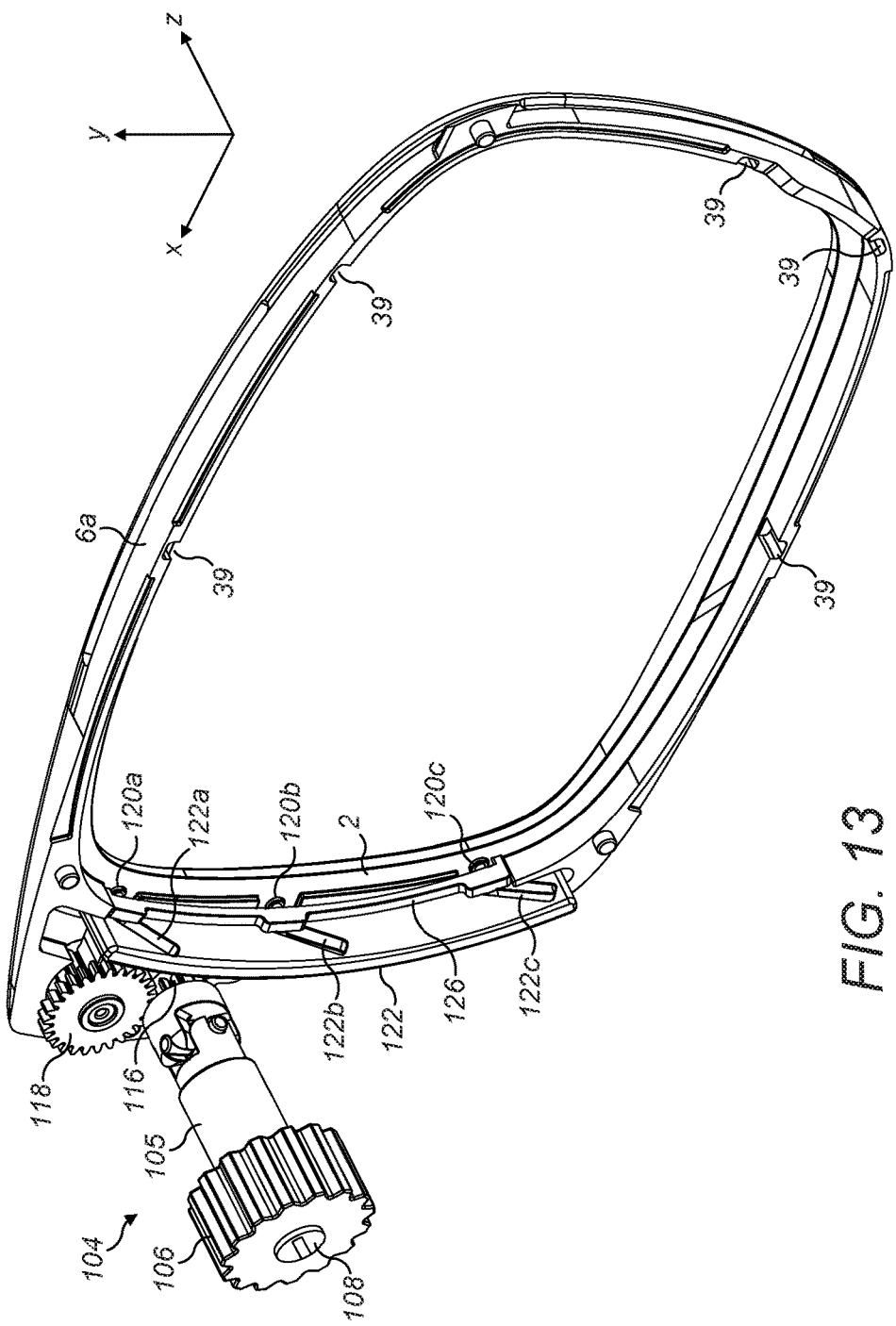
FIG. 13 is a perspective view of one half of a two-part retaining ring for holding the lens assembly, showing the actuation mechanism for the lens.

In the present embodiment, the one short side 7 of the rings 2, 10 substantially follows a circular contour of the membrane 8, and so does not need to bend much along its length. Nevertheless, because the lens is not round, although the difference is minimal, the outer two actuation points 120*a* and 120*c* still need to be displaced slightly further than the central point 120*b* to maintain the correct profile of the supporting rings, and so the short side 7 exhibits a degree of bending during operation of the lens assembly 1. This can be understood by considering once again the profile of the ring as projected onto a notional sphere representing the desired spherical mode of deformation of the membrane 8 of the present embodiment. In this way it can be imagined that in order to follow the profile of the sphere, the outer points 120*a* and 120*c* would be further down the z-axis than the central point 120*b*. These different displacements required are achieved by the slightly different angles of the recesses 122*a-c* in the cam plate 122, as mentioned above and visible in FIG. 13. For the same translational movement of the cam plate 122, the consequent degree of movement between the recesses 122*a-c* and their respective tabs 120*a-c* on the front ring 2 depends on the angle of the recess. With reference to FIG. 13, the smaller the angle of the recess 122 relative to the width of the cam plate 122, (i.e. the closer the recess is to running across the width of the cam plate 122) the greater the proportion of total force imparted by the y-direction translation of the cam plate will be directed in the z-direction. Consequently the movement in the z-direction of the rings 2, 10 towards or away from the front shell 6*a* of the retaining ring will be greater at those points of shallower angle. In this case, the recesses 122*a* and 122*c* are disposed at a shallower angle than the recess 122*b*, and hence the rings 2, 10 are moved relative to the front shell 6*a* of the retaining ring more at the tabs 120*a* and 122*c* than at the tab 120*b*. Thus a single actuator is used to provide a differential degree of movement along the short side 7. Consequently, the lens assembly 1 is conveniently actuated at the three points 120*a-c* so as to afford a good control of the profile of the supporting member along that side.

The control points 120*a-h*—namely actuation points 120*a-c* and hinge points 120*d-f*—are also positioned so as to stabilise the membrane supporting rings 2, 10 against spontaneous deformation according to undesired modes as described below. Thus, while the hinge points 120*d-h* are placed on a contour of zero (or substantially zero) displacement of the rings 2, 10, at least three of them are also desirably placed at points selected to inhibit deformation of the membrane 8 under such undesired modes—that is points along the edge of the membrane 8 that would like to be displaced in accordance with the undesired modes, but are restrained from doing so by the hinge points 120*d-h*. It will be appreciated that the actuation points 120*a-c* likewise inhibit uncontrolled displacement of the edge of the membrane 8, but can be selectively displaced controllably in accordance with the desired modes of deformation of the membrane 8 as described above.

As described above, the membrane supporting rings 2, 10 must bend on the z-axis upon actuation of the lens assembly 1. The supporting rings 2, 10 are sufficiently flexible to allow such bending in response to the incremental surface tension in the membrane 8 when the assembly is actuated, but as well as desired bending in a predetermined manner to control the shape of the membrane 8 upon actuation, the flexible supporting rings 2, 10 are also vulnerable to uncontrolled bending, which should be avoided in order to maintain the fidelity of the membrane shape. In particular, while the supporting rings are configured to bend relative to the planar datum D on actuation, they are also liable to undergo spontaneous uncontrolled deformation. This may take the form of in-plane collapse or out-of-plane bending. Such out of plane bending may comprise one or more undesired, but energetically favoured modes of deformation, for instance toric (saddle-like) deformation of the membrane 8. This is because the membrane 8 is pre-tensioned as described previously, although this unwanted bending may also occur after the lens has been actuated. Thus in general, it is caused by surface tension in the membrane. This unwanted bending occurs because the tension in the membrane 8 is a form of energy contained in the membrane sub-assembly and the membrane sub-assembly naturally wants to put itself into a lower energy state. By undergoing deformation in accordance with energetically favoured modes, especially lower order modes, the tension in the membrane is reduced and hence energy is lost. This unwanted bending is controlled in accordance with the present invention. It will be appreciated that while the desired bending modes may be pure Zernike modes based on a unit circle as described above, the undesired bending modes to be inhibited by the control points in accordance with the invention are controlled by the actual shape of the membrane.

As described above, the membrane 8 of the present embodiment is pre-tensioned across the supporting rings 2, 10 in the un-actuated state to a strain of up to about 5% to reduce or eliminate sagging or wrinkling of the membrane. In some embodiments an even greater pre-tension may be used if needed, for instance up to 10% or even 15% or 20%.

This pre-tension acts to provide a degree of strain on the supporting rings 2, 10 and, without support, the rings would be susceptible to uncontrolled deformation. Further, upon actuation of the assembly 1, the pressure of fluid 11 within the cavity 22 changes, causing the membrane 8 to distend. The surface tension in the membrane 8 thus increases, and additional stress is applied to the supporting rings 2, 10, increasing the risk of unwanted distortion in the desired shape of the supporting rings 2, 10.

In the lens assembly described herein, the transparent disk 24 serves to support the membrane sub-assembly against folding inwards under in-plane bending. Upon actuation of the assembly 1, the support disk 24 is sufficiently flexible to bend with the membrane supporting rings 2, 10 on the z-axis relative to the datum plane D, but serves to reinforce the rings 2, 10 against unwanted in-plane bending on the x- or y-axes. The disk 24 serves to stiffen the supporting rings 2, 10 in the x-y plane, but does not significantly increase the out-of-plane stiffness of the rings on the z-axis, thereby allowing the rings to deflect on the z-axis relative to the datum plane to adopt the desired profile that is needed to produce the predefined form of the membrane 8 upon actuation. By stiffening the supporting rings 2, 10 in the x-y plane, the rings 2, 10 are reinforced against bending or other deformation in the x-y plane under the influence of the surface tension in the membrane 8 which acts on the rings when un-actuated and actuated.

In the present embodiment the support disk 24 is made from polycarbonate, but in other embodiments the diaphragm may suitably be made from a fibre material having suitable stiffness in the x-y plane, but little stiffness in the z-direction owing to the orientation of the fibres.

The disk 24 of the present embodiment has a substantially uniform in-plane stiffness, but in some embodiments a diaphragm may be used which is stiffer in the N-S direction than in the E-W direction, and this directional stiffness may be used to compensate further for the differential strain in the membrane 8 when actuated.

In order to achieve satisfactory deformation of the membrane 8, it is desirable to maintain substantially uniform surface tension within the membrane 8. For optical applications, such as the lens assembly 1 of the present embodiment, this is a factor in ensuring good optical quality of the lens. In the case of an assembly in which the membrane is longer in one dimension in the x-y plane than it is in the other dimension, as for example in the case of the generally rectangular lens assembly 1 of the present embodiment, the supporting rings 2, 10 are usually required to bend more along the longer axis than they are along the shorter axis in order to produce the desired membrane form upon actuation. In the present embodiment, the supporting rings 2, 10 are deflected on the z-axis more along the E-W axis upon actuation, as shown in FIG. 9, than they are along the N-S axis. This differential bending of the supporting rings 2, 10 may introduce a small degree of anisotropy to the surface tension within the membrane 8, since the membrane 8 is strained more in the E-W direction than it is in the N-S direction. However, the support disk 24 bends in the z-direction predominantly along one axis—the E-W direction—and this tends to increase the out-of-plane stiffness of the supporting rings 2, 10 along the other N-S axis. The bending of the supporting rings 2, 10 along the E-W direction has the effect of bringing the short sides 7, 9 of the supporting rings 2, 10 closer together, while stiffening the supporting rings 2, 10 against similar bending inwards in the N-S direction, which has the effect of attenuating the strain on the membrane 8 in the E-W direction whilst maintaining the strain on the membrane 8 in the N-S direction, thereby tending to rebalance the surface tensions in the membrane 8 in the E-W and N-S direction. This is a small effect however, especially since the pretension strain is significantly greater than the incremental actuation strain, and in some embodiments it may be more desirable to maintain uniform out of plane stiffness of the support disk in the E-W and N-S directions.

The fluid-filled dish-shaped part 12, with its flexible side wall 18, and membrane sub-assembly 2, 8, 10 form a resilient cushion-like envelope. Upon compressing the cavity 22, the pressure of the fluid 11 within the cavity 22 is progressively increased relative to ambient pressure, causing the elastic membrane 8 to distend. Similarly, in other embodiments the cavity 22 may be expanded causing the fluid pressure to decrease relative to ambient pressure. Upon releasing the force applied by the actuating device at the actuation points 120a-c the assembly automatically resiliently reverts to its un-actuated state. The transparent disk 24 assists in maintaining control of the sub-assembly during this actuation and de-actuation.

Whilst the support disk 24 is employed for reducing the likelihood or preventing the supporting rings 2, 10 and the elastic membrane 8 from folding in on themselves (in-plane bending), the present invention additionally addresses the problem of unwanted out-of-plane bending in accordance with undesired bending modes in response to loading through tension in the membrane. This can occur notwithstanding the additional in-plane stiffness afforded by the support disk 24. This problem may be particularly apparent when the membrane is planar, for instance in an un-actuated state, where any deviation from flatness releases some of the surface tension and is therefore favoured. However, as previously explained, buckling may also occur when the assembly is actuated, for instance in embodiments where the membrane has a planar form when actuated, although the effect tends to diminish as the membrane is progressively distended.

Figure 14:
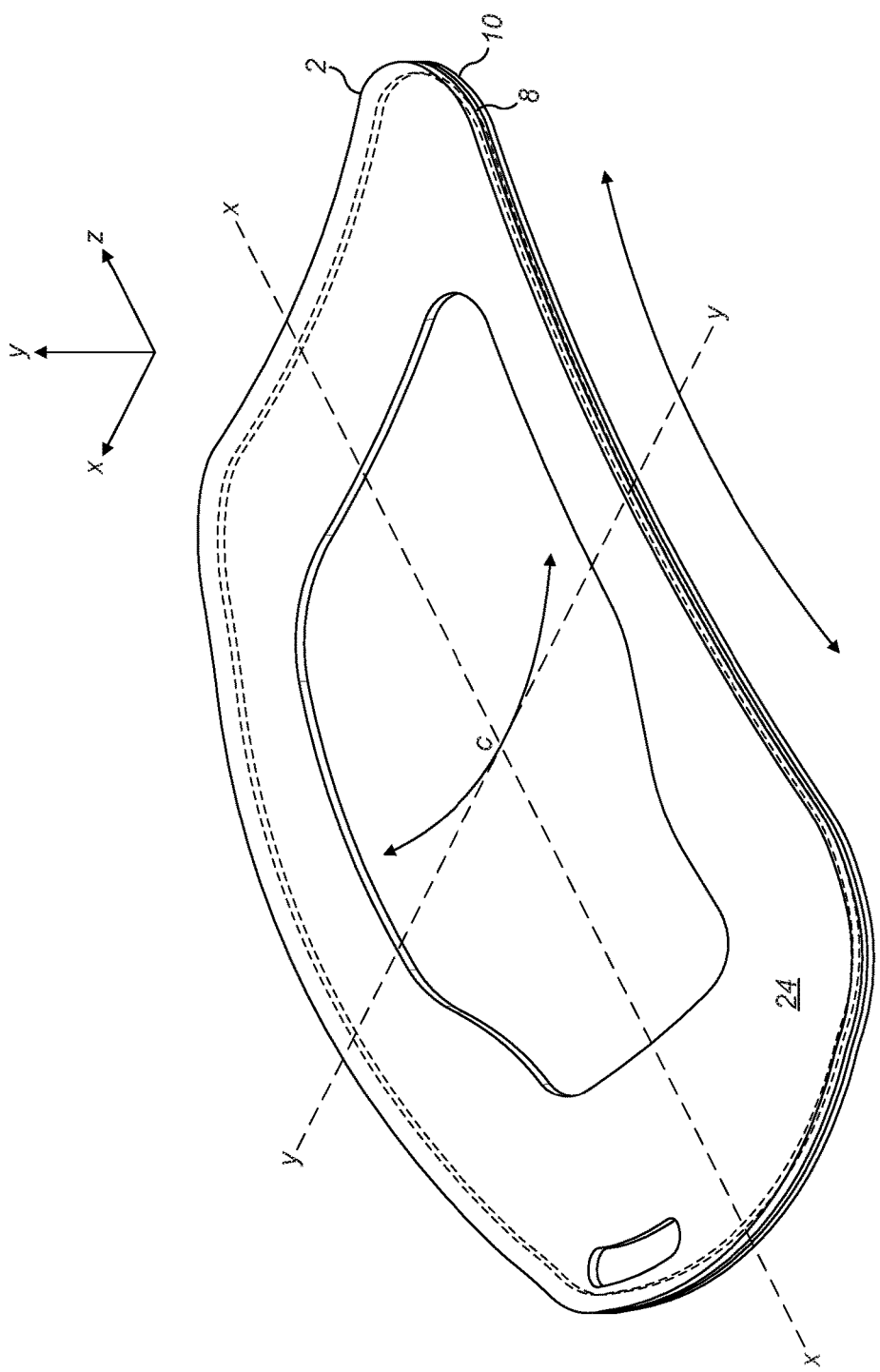
FIG. 14 is a perspective view of the membrane and rings when they have undergone unwanted toric deformation.

FIG. 14 shows a membrane sub-assembly which has undergone undesired toric bending in accordance with energetically favourable lower order undesired bending modes to form a saddle shape. The front and rear rings 2, 10, the membrane 8 and the diaphragm 24 are shown. The sub-assembly can be considered to begin generally planar as defined in the x-y plane and to have a centre point C at which central x and y-axes cross, the x-axis being along the longer length of the sub-assembly and the y-axis being along the shorter length. In a region around the x-axis distal from the centre point the membrane 8 has bent or curved out-of-plane downwards in the z-direction and in a region around the y-axis distal from the centre point it has bent or curved upwards out-of-plane in the z-direction. Thus these two regions of bending have occurred in opposite directions to form a saddle shape. It will be appreciated that once this happens, the lens cannot function correctly, because the sub-assembly no longer has the correct datum plane shape.

Embodiments of the present invention mitigate the risk of a sub-assembly suffering from the spontaneous undesired deformation shown in FIG. 14 by virtue of the control points 120a-h.

A minimum of three control points 120 is required to define the plane of the supporting rings 2, 10, as described in more detail in co-pending PCT/GB2012/051426. In a compression actuated membrane assembly, such for example as the present embodiment, at least one of these three minimum control points 120 must be an actuation point 120a-c; one or two may be hinge points 120e-g. It has now been found that the problem of unwanted out-of-plane bending can be addressed by carefully positioning the control points 120, where the position of the membrane 8 relative to the retaining ring 6 is controlled, round the centre of the membrane to suppress undesired lower order bending modes, while inducing desired bending modes. This is especially useful when the lens assembly is loaded under pre-tension and the membrane is planar or nearly planar, but it is generally important to suppress undesired bending modes of the membrane 8 to ensure fidelity of the membrane form regardless of its state of actuation.

In some embodiments, the minimum three control points 120, when correctly situated, may be sufficient to suppress at least the lowest order undesired bending modes that do not have a node round the entire membrane boundary, but in other embodiments it may be necessary to use additional control points 120*d*, 120*h* to provide the requisite degree of stabilisation, particularly if the control points 120 that are required to actuate the assembly and control the profile of the supporting rings 2, 10 at the turning points as described above are not appropriately positioned to suppress the undesired bending modes.

In order to suppress lower order undesired bending modes, the control points 120 should suitably be located so as to increase the energy of the first out-of-plane undesired bending modes of the rings 2, 10 in response to loading through tension in the membrane 8 which do not have a node around the edge of the whole membrane 8. In other words, the control points 120 should be situated at points where the edge of the membrane wishes to move in accordance with the undesired bending modes in response to loading through tension in the membrane 8, so that the position of the membrane edge is controlled at those points.

On a more practical level, subject to the above, the angular spacing of the control points around the optical centre OC should be around 30-120°. It should be noted that although the OC is used as a reference point in the presently described embodiment, the centre point used could be an alternative point, such as the geometric centre (boxing centre) or another point in the region of the two.

In the present embodiment, five hinge points 120*d-h* are used to afford control over the rings 2, 10 and membrane 8 by suppressing undesired bending modes. It can be seen from the circle shown in chain-dotted lines in FIG. 9 that the hinge points 120*d-h* are all substantially equidistant from the optical centre OC. In this embodiment the hinge points 120*d-h* are chosen as points of zero or minimal displacement of the edge of the membrane 8 as required for spherical deformation in accordance with the desired second order Zernike mode $Z_2^0$ when the assembly 1 is actuated by selectively displacing the rings 2, 10 at the actuation points 120*a-c* on the z-axis, while suppressing first order and other undesired second (approximately astigmatism) modes to prevent saddling of the kind represented in FIG. 14. In other words, upon moving the rings 2,10 relative to the retaining ring 6 so as to compress the body of fluid 11 within the cavity 22, thereby to adjust the form of the membrane 8 as described above, the rings 2, 10 should not be displaced, or should be minimally displaced, at the hinge points 120*d-h*. (They can, however, slide, rotate or bend whilst remaining in position, thus allowing the rings 2, 10 to adopt the correct profile during use of the lens assembly 1). Thus the hinge points 120*d-h* are suitable points to be held in fixed relation to the retaining ring 6.

In other embodiments, where the membrane 8 is desired to bend in accordance with higher order bending modes such, for example, as the second order astigmatism modes $Z_2^{\pm 2}$ or third order trefoil modes $Z_3^{\pm 3}$, the hinge points are still positioned at points of zero displacement for the desired modes, but the zero displacement contour round the centre of the membrane is non-circular.

Two of the hinge points 120*d*, 120*h* of the present embodiment are disposed intermediate the optical centre and the actuation points 120*a-c*. That is to say their orthogonal projection onto the axis E-W shown in FIG. 9 is disposed between the centre OC and the actuation points 120*a-c*. This affords a practical spacing between the control points.

It will be appreciated that additional hinge points 120 could be provided if desired. For example, there are further points on the same zero-displacement contour at the bottom left corner of the lens assembly as shown in FIG. 9 (i.e., the corner between short side 9 and long side 5).

Those skilled in the art will recognise that actuation points may also serve to suppress undesired bending modes provided they are positioned so as to increase the energy of the undesired bending modes. Alternatively the actuation points—unlike the hinge points—may be positioned such in some states of actuation (or when un-actuated) they act to suppress certain undesired bending modes, but in other states of actuation (or when actuated) permit at least one desired bending mode of the same order. Thus, by way of example, one or more actuation points may be situated round the supporting rings 2, 10 so as to suppress second and/or higher order undesired bending modes when the assembly is un-actuated, e.g. when then membrane is planar, but are displaced upon actuation of the assembly in accordance with at least one of the astigmatism $Z_2^{\pm 2}$ or higher order desired bending modes to induce such modes.

The membrane assemblies hereinbefore described may be used for optical applications, such as lens assemblies, and non-optical applications. The terms "front", "rear" etc. are used to describe the parts of the assemblies 1, 1' for clarity and consistency between embodiments of the invention. These terms are appropriate for lens assemblies, where they describe the parts in the context of eyeglasses of the kind shown in FIGS. 1 and 2. For applications (optical and non-optical) other than lens assemblies for eyewear, the parts described as being "front" or "rear" need not necessarily be disposed at or towards the front or rear of the relevant assembly. For instance, in some applications, the membrane may be disposed facing upwardly, so that the "front membrane-supporting ring" is actually disposed above the "rear membrane-supporting ring", and similar terms should be construed accordingly. Indeed, as will be apparent from the present specification, the membrane assemblies of the invention may be used for a wide variety of different applications, where the terms "front" and "rear" may not describe the actual position of the respective parts in use, but nevertheless these terms are useful to describe the relative spatial relationships of the parts within the assemblies of the different embodiments.

The present invention thus provides a membrane assembly 1 comprising a fluid-filled envelope that is bounded on a least one side by an elastic membrane 8 that is held under tension by one or more bendable, peripheral membrane-supporting rings 2, 10. The fluid pressure within the envelope may be increased, e.g., by compressing the envelope, or decreased, e.g., by expanding the envelope, to change the pressure difference across the membrane, thereby causing the membrane to distend convexly or concavely respectively. In accordance with the invention, the position of the rings 2, 10 is controlled at control points 120 that are selected to prevent the membrane 8 from spontaneously bending in accordance with undesired bending modes in response to loading through tension in the membrane. The control points comprise at least three actuation or hinge points that are positioned to increase the energy of at least the lowest order undesired bending modes that do not have a node round the whole of the rings 2, 10. A control point should also be placed at each turning point in the desired profile of the rings 2, 10 in the direction of the force applied to the rings against the force applied to the membrane 8 as a result of the pressure within the cavity 22 in order to control the profile of the rings 2, 10 as desired. The placement of the control points 120 for this purpose is therefore dependent on the boundary shape of the membrane 8 and its desired actuated form. If required therefore additional hinge points 120*d-h* may be employed at points of zero displacement of the rings during actuation in accordance with the desired bending modes that serve to increase the energy of the undesired modes in order to inhibit the undesired bending modes.

Some variations of some of the parameters and components of the described embodiments have already been mentioned. Those skilled in the art will appreciate that many further variations of the particular embodiments described are possible. For example, in the embodiments shown, the width of the support rings 2, 10 varies around their extent to facilitate the correct bending of the rings 2, 10 and hence the edge of the membrane 8 in order to achieve the desired form of the membrane 8. This is not essential for the purpose of stabilizing the membrane sub-assembly from unwanted deformation.

Furthermore, in the present embodiment, the front and rear supporting rings 2, 10 have different thicknesses, but in other embodiments they may have the same thicknesses, and again the thickness is not a crucial parameter in stabilising the rings 2, 10 against undesired bending modes. In some embodiments, the bending stiffness of the disk 24 may be sufficient to balance the torsional forces, in which case the rear ring 10 may be made thinner than the front ring 2 or even omitted. In the latter situation, the transparent disk 24 may incorporate on its front surface a peripheral step or the like to space the disk 24 from the membrane 8—in other words, the rear ring 10 and the transparent disk 24 could effectively be integrated as one component.

Other variations are possible whilst achieving the necessary stabilising of the membrane sub-assembly. The described embodiment uses five hinge points 120*d-h*, but an alternative would be to use only four hinge points. One example of four suitable points would be at points 120*d*, 120*c*, 120*g* and 120*h*. An alternative would be points 120*d*, 120*f*, 120*g* and 120*h*. A further alternative would be points 120*e*, 120*f*, 120*g* and 120*h*. In the case of four hinge points, one or two may be located intermediate the optical centre OC and the one or more actuation points 120*a-c* on the one short side 7 as described above.

Another possible variation from the above-described embodiments is in the number of actuation points. In the example described above, three actuation points 120*a-c* are used. More or fewer than three actuation points could be used. There could be provided a separate cam surface bearing part for each actuation point rather than a single cam plate extending through all the actuation points. The design of the gear and cam arrangement could be varied from that shown whilst still achieving the desired result. The actuation mechanism, optionally with an adjustment wheel similar to the wheel 106, could be placed in the bridge 95 instead of in the temples 94. Other means than manual adjustment could be employed.

Other features of the described lens assembly could be changed within the scope of the invention. For example, the annular shape of the transparent disk 24 could be different. The retaining ring 6 could be shaped such that the front and rear plates 16, 4 are held within the confines of the front and rear shells 6*a*, 6*b*. In the present embodiment, the retaining ring 6 holds the front ring 2 but some other fixed support could be employed, for example multiple fixed supports at discrete locations could be used. Both rings 2, 10 could have features enabling them to be clamped. The retaining ring 6 and the support rings 2, 10 could be variously shaped and configured with mutually cooperating features for holding them fixedly with respect to each other.

As mentioned above, the embodiments of the invention have been described herein with particular reference to lens assemblies, more particularly lens assemblies for use in eyewear. However, the lens assemblies of the present invention are equally well applicable to other lens applications, such as goggles, helmets and scientific and optical instruments of various sorts. In a lens assembly, the optical parts are transparent as described below, but the invention also comprehends other kinds of deformable membrane assemblies which are constructed and operate in a similar manner to provide a controllably adjustable surface. Within the optical field, for instance, the invention may be used to provide a controllably adjustable mirror surface, and membrane assemblies of the invention may also find applications in non-optical fields, such as acoustics, where a surface with a selectively and controllably adjustable dynamic shape may be required.

The lens assemblies of the invention are especially suitable for the correction of presbyopia. In use, the lens assembly 1; 1' can be adjusted by actuating the assembly for bringing into focus objects at a range of distances from long distance to close distance.

The invention claimed is:

1. A system, comprising:
    a fluid filled lens or a mirror assembly, the fluid-filled lens or the mirror assembly having a support;
    a fluid-filled envelope, at least one wall of which is formed by a non-round distensible elastic membrane that is arranged to provide a substantially spherical optical surface of adjustable optical power and having an optical center, the distensible elastic membrane defining a datum x,y-plane and being distensible on a z-axis perpendicular to the datum x,y-plane and being held under tension around its edge by a flexible membrane supporting member which is coupled to the support at a plurality of discrete control points located around the supporting member for controlling the position of the membrane edge on the z-axis relative to the support at the control points, and the supporting member being unconstrained between said control points; and
    at least one pressure adjuster operable to adjust the pressure of the fluid within the envelope, thereby adjusting the shape of the distensible elastic membrane to change the optical power of the optical surface;
    wherein the plurality of discrete control points comprises at least three hinge points at which the membrane supporting member is hinged to the support at a fixed location relative to the support to prevent displacement of the supporting member on the z-axis relative to the support at each hinge point, the hinge points being situated at spaced locations around the membrane edge that are substantially equidistant from the optical center of the distensible elastic membrane.

2. The system of claim 1, wherein each control point is angularly spaced from its adjacent control points by an angle of 30-120° about the center of the distensible elastic membrane.

3. The system of claim 1, wherein at least one control point of the plurality of discrete control points comprises an actuation point; the pressure adjuster being connected to the membrane supporting member at the actuation point such that it is operable to cause controlled displacement of the supporting member on the z-axis relative to the support.

4. The system of claim 3, wherein said membrane is generally elongate, being longer on one axis than on an orthogonal axis, wherein the one axis and the orthogonal axis pass through the optical center of the distensible elastic membrane, and having two opposite long sides that extend across said orthogonal axis, and wherein the control points comprise at least one actuation point on the supporting member proximate a first end of the one axis, at least one hinge point proximate a second end of the one axis and at least one intermediate hinge point on one of the long sides of the supporting member intermediate the first end of the one axis and the optical center.

5. The system of claim 4, wherein one or more actuation points are provided proximate the first end of the one axis, and at least two intermediate hinge points are situated on the supporting member between said one or more actuation points at the first end of the one axis and the optical center of the distensible elastic membrane, a first intermediate hinge point of the at least two intermediate hinge points being on one of the long sides of the supporting member, and a second intermediate hinge point of the at least two intermediate hinge points being on the other long side.

6. The system of claim 3, wherein one or more actuation points are provided proximate the first end of the one axis, and at least two intermediate hinge points are situated on the supporting member between said one or more actuation points at the first end of the one axis and the optical center of the distensible elastic membrane, a first intermediate hinge point of the at least two intermediate hinge points being on one of the long sides of the supporting member, and a second intermediate hinge point of the at least two intermediate hinge points being on the other long side.

7. The system of claim 1, further comprising one or more bending controllers arranged to control bending or other deformation of the membrane supporting member in response to surface tension in the distensible elastic membrane.

8. The system of claim 1, wherein at least four hinge points are situated at spaced locations around the membrane edge, the spaced locations being substantially equidistant from the optical center of the distensible elastic membrane.

9. The system of claim 1, wherein at least five hinge points are situated at spaced locations around the membrane edge, the spaced locations being substantially equidistant from the optical center of the distensible elastic membrane.

10. The system of claim 1, wherein at least six hinge points are situated at spaced locations around the membrane edge, the spaced locations being substantially equidistant from the optical center of the distensible elastic membrane.

11. A system, comprising:
a fluid filled lens or a mirror assembly, the fluid-filled lens or the mirror assembly having a support;
a fluid-filled envelope, at least one wall of which is formed by a distensible elastic membrane that serves to provide an optical surface of adjustable optical power defined by one or more Zernike polynomials and having an optical center; the distensible elastic membrane defining a datum x,y-plane and being distensible on a z-axis perpendicular to the datum x,y-plane and being held under tension around its edge by a flexible membrane supporting member that is coupled to the support at a plurality of discrete control points located around the supporting member for controlling the position of the membrane edge on the z-axis relative to the support at the control points, and the supporting member being unconstrained between said control points; and
at least one pressure adjuster operable to adjust the pressure of the fluid within the envelope, thereby to adjusting the shape of the distensible elastic membrane to change the optical power of the optical surface;
wherein the plurality of discrete control points comprise at least three hinge points at which the membrane supporting member is hinged to the support at a fixed location relative to the support to prevent displacement of the supporting member on the z-axis relative to the support at each hinge point, the hinge points being situated at spaced locations around the membrane edge that lie on a non-circular contour about the optical center of the distensible elastic membrane that is defined by an intersection of the optical surface defined by one or more Zernike polynomials with the x,y-plane defined by the distensible elastic membrane.

12. The fluid-filled lens as claimed in claim 11, wherein the optical surface of adjustable optical power is defined by a plurality of Zernike polynomials selected from second, third and fourth order Zernike polynomials.

13. The system of claim 11, wherein the membrane is non-circular.

14. The system of claim 11, wherein each one of the plurality of discrete control points is angularly spaced from its adjacent control points by an angle of 30-120° about the optical center of the distensible elastic membrane.

15. The system of claim 11, wherein the plurality of discrete control points comprises at least one actuation point; the pressure adjuster being connected to the membrane supporting member at the actuation point such that it is operable to cause controlled displacement of the supporting member on the z-axis relative to the support.

16. The system of claim 15, wherein the plurality of Zernike polynomials include the spherical second order Zernike polynomial $Z_2^0$.

17. The system of claim 15, wherein the distensible elastic membrane is generally elongate, being longer on one axis than on an orthogonal axis, which axes pass through the optical center of the distensible elastic membrane, and having two opposite long sides that extend across said orthogonal axis, and wherein the control points comprise at least one actuation point on the supporting member proximate a first end of the one axis, at least one hinge point proximate a second end of the one axis and at least one intermediate hinge point on one of the long sides of the supporting member intermediate the first end of the one axis and the optical center.

18. The system of claim 11, wherein the plurality of discrete control points includes one or more control points that are situated at or proximate each location around the supporting member where the intersection of the x,y-plane defined by the distensible elastic membrane with the optical surface defined by one or more Zernike polynomials exhibits a turning point in a direction opposite to a direction of distension of the distensible elastic membrane.

19. The system of claim 11, further comprising one or more bending controllers arranged to control bending or other deformation of the membrane supporting member in response to the surface tension in the distensible elastic membrane.

20. The system of claim 11, further comprising an article of eyewear.

21. The system of claim 11, wherein at least four hinge points are situated at spaced locations around the membrane edge that lie on a non-circular contour about the optical center of the distensible elastic membrane defined by the intersection of the optical surface defined by one or more Zernike polynomials with the x,y-plane defined by the distensible elastic membrane.

22. The system of claim 11, wherein at least five hinge points are situated at spaced locations around the membrane edge that lie on a non-circular contour about the optical center of the distensible elastic membrane defined by the intersection of the optical surface defined by one or more Zernike polynomials with the x,y-plane defined by the distensible elastic membrane.

23. The system of claim 11, wherein at least six hinge points are situated at spaced locations around the membrane edge that lie on a non-circular contour about the optical center of the distensible elastic membrane defined by the intersection of the optical surface defined by one or more Zernike polynomials with the x,y-plane defined by the distensible elastic membrane.

* * * * *